United States Patent
Hwang et al.

(10) Patent No.: US 12,207,234 B2
(45) Date of Patent: Jan. 21, 2025

(54) METHOD OF TRANSMITTING AND RECEIVING PSFCH IN WIRELESS COMMUNICATION SYSTEM AND APPARATUS THEREFOR

(71) Applicant: LG ELECTRONICS INC., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 17/700,771

(22) Filed: Mar. 22, 2022

(65) Prior Publication Data
US 2022/0303954 A1 Sep. 22, 2022

Related U.S. Application Data

(60) Provisional application No. 63/175,496, filed on Apr. 15, 2021.

(30) Foreign Application Priority Data

Mar. 22, 2021 (KR) .................. 10-2021-0036739
Mar. 26, 2021 (KR) .................. 10-2021-0039847
Jun. 22, 2021 (KR) .................. 10-2021-0081063

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0051* (2013.01); *H04W 28/26* (2013.01);
(Continued)

(58) Field of Classification Search
CPC . H04W 72/02; H04W 28/26; H04W 72/0446; H04W 72/0453; H04W 72/20;
(Continued)

(56) References Cited

U.S. PATENT DOCUMENTS 11,539,492 B2 * 12/2022 Cheng .................. H04L 1/1896
2020/0351032 A1 * 11/2020 Wu ........................ H04W 72/56
2023/0131882 A1 * 4/2023 Lin .................. H04W 72/0446
370/329

FOREIGN PATENT DOCUMENTS

WO WO2020063742 4/2020

OTHER PUBLICATIONS

International Search Report in International Appln. No. PCT/KR2022/003873, dated Jul. 4, 2022, 5 pages (with English translation).
(Continued)

*Primary Examiner* — Ashley Shivers
(74) *Attorney, Agent, or Firm* — Fish & Richardson P.C.

(57) ABSTRACT

A method of transmitting and receiving a PSFCH in a wireless communication system and a device therefor are disclosed. The method performed by a first UE comprises receiving, from a second UE, a first PSCCH including first SCI, receiving, from a third UE, a second PSCCH including second SCI, determining, based on a resource reserved by the first SCI overlapping a resource reserved by the second SCI, a resource conflict in the resource reserved by the first SCI using a RSRP measured based on the first PSCCH and a RSRP measured based on the second PSCCH, and transmitting, to the second UE, the PSFCH including conflict information indicating the resource conflict in the resource.

13 Claims, 16 Drawing Sheets

(51) Int. Cl.
  *H04W 28/26* (2009.01)
  *H04W 72/0446* (2023.01)
  *H04W 72/0453* (2023.01)
  *H04W 72/20* (2023.01)
(52) U.S. Cl.
  CPC ... *H04W 72/0446* (2013.01); *H04W 72/0453* (2013.01); *H04W 72/20* (2023.01)
(58) Field of Classification Search
  CPC ... H04W 72/25; H04W 72/542; H04W 92/18; H04L 5/0051; H04L 5/0055; H04L 5/006; H04L 1/1812
  See application file for complete search history.

(56) References Cited

OTHER PUBLICATIONS

Extended European Search Report in European Appln. No. 22776001.4, mailed on Jan. 17, 2024, 11 pages.

Lenovo, Motorola Mobility, "Sidelink resource allocation for Reliability enhancement," 3GPP TSG RAN WG1 #104-e, R1-2100767, e-Meeting, Jan. 25-Feb. 5, 2021, 6 pages.

Moderator (LG Electronics), "Feature lead summary for AI8.11.2.2 Feasibility and benefits for mode 2 enhancements," #3GPP TSG RAN WGI #103-e, R1-2009788, e-Meeting, Oct. 26-Nov. 13, 2020, 79 pages.

Qualcomm Incorporated, "Reliability and Latency Enhancements for Mode 2," 3GPP TSG RAN WG1 Meeting #104-e, R1-2101486, Jan. 25-Feb. 5, 2021, 23 pages.

Qualcomm Incorporated, "Reliability and Latency Enhancements for Mode 2," 3GPP TSG RAN WG1 Meeting #103-e, R1-2009273, Oct. 26-Nov. 13, 2020, 19 pages.

Qualcomm Incorporated, "Sidelink resource allocation Mechanism for NR V2X," 3GPP TS-RAN WG1 #98bis, R1-1912946, Nov. 18-22, 2019, Reno, USA, 23 pages.

Samsung, "Corrections on Sidelink," 3GPP TSG-RAN WG1 Meeting #100-e, R1-2001458, e-Meeting, Feb. 24-Mar. 6, 2020, 9 pages.

* cited by examiner

BS (e.g. eNB or gNB)

UE 1    UE 2

METHOD OF TRANSMITTING AND RECEIVING PSFCH IN WIRELESS COMMUNICATION SYSTEM AND APPARATUS THEREFOR

CROSS-REFERENCE TO RELATED APPLICATIONS

The present application claims the benefit of an earlier filing date and right of priority to Application No. 10-2021-0036739 filed on 22 Mar. 2021 in Korea, No. 10-2021-0039847 filed on 26 Mar. 2021 in Korea, U.S. No. 63/175,496 filed on 15 Apr. 2021 in United States, and No. 10-2021-0081063 filed on 22 Jun. 2021 in Korea, the contents of which are hereby incorporated by reference in its entirety.

TECHNICAL FIELD

The present disclosure relates to a wireless communication system, and more particularly to a method of transmitting and receiving a physical sidelink control channel (PSCCH) and/or a physical sidelink shared channel (PSSCH) and a device therefor.

BACKGROUND

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between user equipments (UEs) and the UEs exchange voice and data directly with each other without intervention of a base station (BS). The SL communication is under consideration as a solution to the overhead of the base station caused by rapidly increasing data traffic.

Techniques for efficiently using resources between UEs and increasing reliability in the SL communication are being discussed.

SUMMARY

The present disclosure provides a method of transmitting and receiving conflict information for sidelink (SL) resources (e.g., PSCCH/PSSCH resource) and a device therefor.

The present disclosure also provides a method of omitting resource reselection when receiving conflict information and a device therefor.

The present disclosure also provides a method of performing resource reselection when receiving conflict information and a device therefor.

The present disclosure also provides a method of performing a decoding with only received data acquired based on SL retransmission and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

In one aspect of the present disclosure, there is provided a method of transmitting a physical sidelink feedback channel (PSFCH) in a wireless communication system. The method performed by a first user equipment (UE) comprises receiving, from a second UE, a first physical sidelink control channel (PSCCH) including first sidelink control information (SCI), receiving, from a third UE, a second PSCCH including second SCI, determining, based on a resource reserved by the first SCI overlapping a resource reserved by the second SCI, a resource conflict in the resource reserved by the first SCI using a reference signal received power (RSRP) measured based on the first PSCCH and a RSRP measured based on the second PSCCH, receiving, from the second UE, third SCI including source identifier (ID) information based on the first SCI, determining a resource for the PSFCH based on the source ID information, and transmitting, to the second UE, the PSFCH including conflict information indicating the resource conflict in the resource.

The resource conflict may be determined by comparing a difference value between the RSRP measured based on the first PSCCH and the RSRP measured based on the second PSCCH with a preset threshold.

The RSRP measured based on the first PSCCH may be measured based on a demodulation reference signal (DMRS) for the first PSCCH, and the RSRP measured based on the second PSCCH may be measured based on a DMRS for the second PSCCH.

The third SCI may be included in the PSSCH.

Based on the conflict information, a resource capable of being determined by the second UE may include a resource based on time resource assignment information included in the first SCI.

Based on the conflict information, a resource capable of being determined by the second UE may be included in a slot different from a slot of a resource corresponding to the conflict information.

In another aspect of the present disclosure, there is provided a first user equipment (UE) configured to transmit a physical sidelink feedback channel (PSFCH) in a wireless communication system, the first UE comprising at least one transceiver, at least one processor, and at least one memory operably connectable to the at least one processor and storing instructions that, based on being executed by the at least one processor, perform operations comprising receiving, from a second UE, a first physical sidelink control channel (PSCCH) including first sidelink control information (SCI), receiving, from a third UE, a second PSCCH including second SCI, determining, based on a resource reserved by the first SCI overlapping a resource reserved by the second SCI, a resource conflict in the resource reserved by the first SCI using a reference signal received power (RSRP) measured based on the first PSCCH and a RSRP measured based on the second PSCCH, receiving, from the second UE, third SCI including source identifier (ID) information based on the first SCI, determining a resource for the PSFCH based on the source ID information, and transmitting, to the second UE, the PSFCH including conflict information indicating the resource conflict in the resource.

The resource conflict may be determined by comparing a difference value between the RSRP measured based on the first PSCCH and the RSRP measured based on the second PSCCH with a preset threshold.

The RSRP measured based on the first PSCCH may be measured based on a demodulation reference signal (DMRS) for the first PSCCH, and the RSRP measured based on the second PSCCH may be measured based on a DMRS for the second PSCCH.

In another aspect of the present disclosure, there is provided a method of receiving a physical sidelink feedback channel (PSFCH) in a wireless communication system. The method performed by a second user equipment (UE) comprises transmitting, to a first UE, a first physical sidelink control channel (PSCCH) including first sidelink control information (SCI), wherein a resource conflict in a resource reserved by the first SCI is determined, based on the resource reserved by the first SCI overlapping a resource reserved by the second SCI included in a second PSCCH of a third UE, using a reference signal received power (RSRP) measured based on the first PSCCH and a RSRP measured based on the second PSCCH, transmitting, to the first UE, third SCI including source identifier (ID) information based on the first SCI, wherein a resource for the PSFCH is determined based on the source ID information, and receiving, from the first UE, the PSFCH including conflict information indicating the resource conflict in the resource.

The resource conflict may be determined by comparing a difference value between the RSRP measured based on the first PSCCH and the RSRP measured based on the second PSCCH with a preset threshold.

The RSRP measured based on the first PSCCH may be measured based on a demodulation reference signal (DMRS) for the first PSCCH, and the RSRP measured based on the second PSCCH may be measured based on a DMRS for the second PSCCH.

The third SCI may be included in the PSSCH.

Based on the conflict information, a resource capable of being determined by the second UE may include a resource based on time resource assignment information included in the first SCI.

Based on the conflict information, a resource capable of being determined by the second UE may be included in a slot different from a slot of a resource corresponding to the conflict information.

In another aspect of the present disclosure, there is provided a second user equipment (UE) configured to receive a physical sidelink feedback channel (PSFCH) in a wireless communication system, the second UE comprising at least one transceiver, at least one processor, and at least one memory operably connectable to the at least one processor and storing instructions that, based on being executed by the at least one processor, perform operations comprising transmitting, to a first UE, a first physical sidelink control channel (PSCCH) including first sidelink control information (SCI), wherein a resource conflict in a resource reserved by the first SCI is determined, based on the resource reserved by the first SCI overlapping a resource reserved by the second SCI included in a second PSCCH of a third UE, using a reference signal received power (RSRP) measured based on the first PSCCH and a RSRP measured based on the second PSCCH, transmitting, to the first UE, third SCI including source identifier (ID) information based on the first SCI, wherein a resource for the PSFCH is determined based on the source ID information, and receiving, from the first UE, the PSFCH including conflict information indicating the resource conflict in the resource.

The resource conflict may be determined by comparing a difference value between the RSRP measured based on the first PSCCH and the RSRP measured based on the second PSCCH with a preset threshold.

The RSRP measured based on the first PSCCH may be measured based on a demodulation reference signal (DMRS) for the first PSCCH, and the RSRP measured based on the second PSCCH may be measured based on a DMRS for the second PSCCH.

In another aspect of the present disclosure, there is provided a processing apparatus configured to control a first user equipment (UE) to transmit a physical sidelink feedback channel (PSFCH) in a wireless communication system, the processing apparatus comprising at least one processor, and at least one memory operably connectable to the at least one processor and storing instructions that, based on being executed by the at least one processor, perform operations comprising receiving, from a second UE, a first physical sidelink control channel (PSCCH) including first sidelink control information (SCI), receiving, from a third UE, a second PSCCH including second SCI, determining, based on a resource reserved by the first SCI overlapping a resource reserved by the second SCI, a resource conflict in the resource reserved by the first SCI using a reference signal received power (RSRP) measured based on the first PSCCH and a RSRP measured based on the second PSCCH, receiving, from the second UE, third SCI including source identifier (ID) information based on the first SCI, determining a resource for the PSFCH based on the source ID information, and transmitting, to the second UE, the PSFCH including conflict information indicating the resource conflict in the resource.

In another aspect of the present disclosure, there is provided a computer readable storage medium storing at least one instruction, that, based on being executed by the at least one processor, allows at least one processor to control operations comprising receiving, from a first user equipment (UE), a first physical sidelink control channel (PSCCH) including first sidelink control information (SCI), receiving, from a second UE, a second PSCCH including second SCI, determining, based on a resource reserved by the first SCI overlapping a resource reserved by the second SCI, a resource conflict in the resource reserved by the first SCI using a reference signal received power (RSRP) measured based on the first PSCCH and a RSRP measured based on the second PSCCH, receiving, from the first UE, third SCI including source identifier (ID) information based on the first SCI, determining a resource for the PSFCH based on the source ID information, and transmitting, to the first UE, the PSFCH including conflict information indicating the resource conflict in the resource.

According to the preset disclosure, there is an effect of reducing a signaling overhead and improving a waste of resources by efficiently transmitting and receiving conflict information for SL resources.

According to the preset disclosure, there is an effect of efficiently using resources by omitting resource reselection even if conflict information is received.

According to the preset disclosure, there is an effect of improving a signaling overhead by efficiently performing resource reselection when conflict information is received.

According to the preset disclosure, there is an effect of implementing low latency and high reliability communication system by performing decoding with only received data acquired based on SL retransmission.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

DETAILED DESCRIPTION

In various embodiments of the present disclosure, "I" and "," should be construed to indicate "and/or". For example, "A/B" may mean "A and/or B". Furthermore, "A, B" may mean "A and/or B". In addition, "A/B/C" may mean "at least one of A, B and/or C". Furthermore, "A, B, C" may mean "at least one of A, B and/or C".

In various embodiments of the present disclosure, "or" should be construed to indicate "and/or". For example, "A or B" may include "only A", "only B", and/or "both A and B". In other words, "or" should be construed to indicate "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features based on an embodiment of the present disclosure will not be limited only to this.

Figure 1:
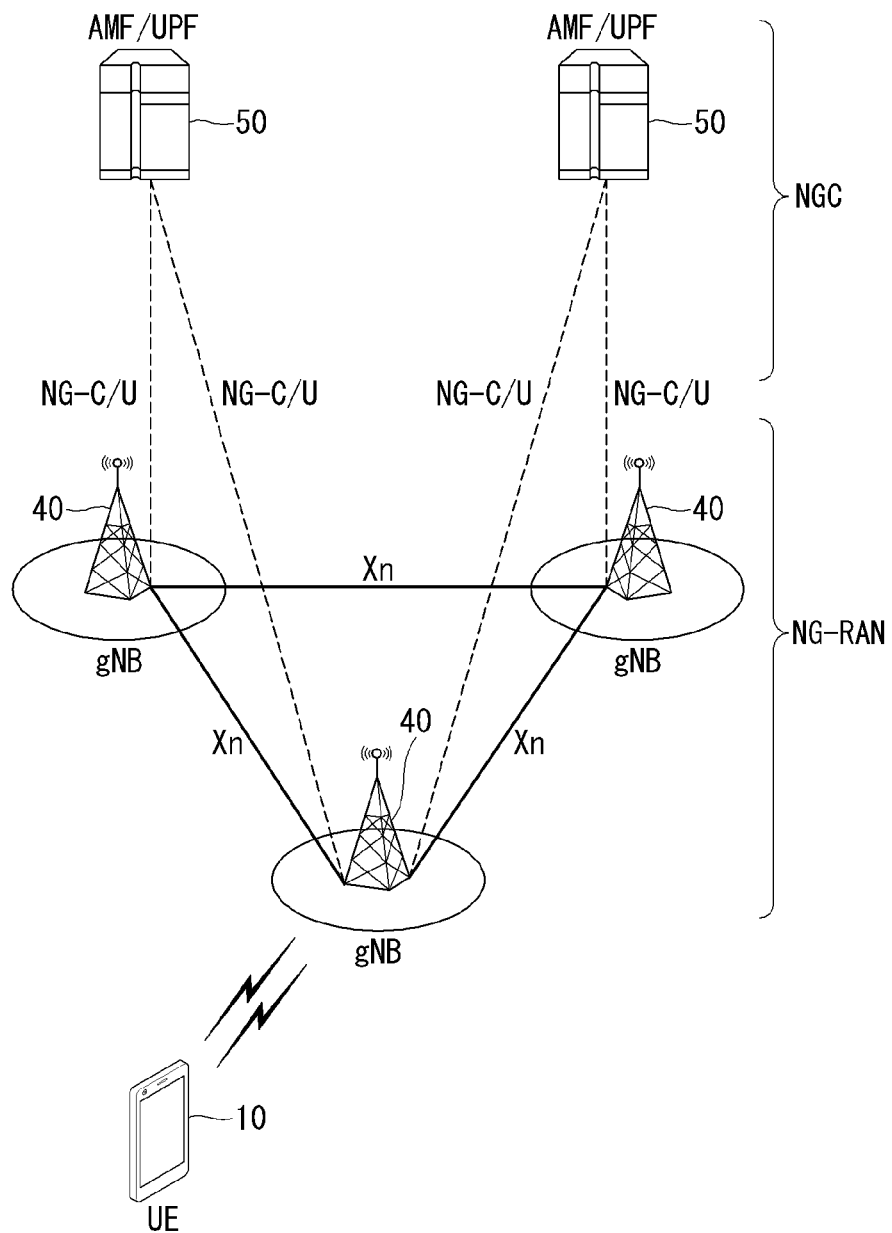
FIG. 1 illustrates a structure of an NR system according to an embodiment of the present disclosure.

FIG. 1 illustrates a structure of an NR system, based on an embodiment of the present disclosure.

Referring to FIG. 1 a Next Generation-Radio Access Network (NG-RAN) may include a next generation-Node B (gNB) and/or eNB providing a user plane and control plane protocol termination to a user. FIG. 1 illustrates a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
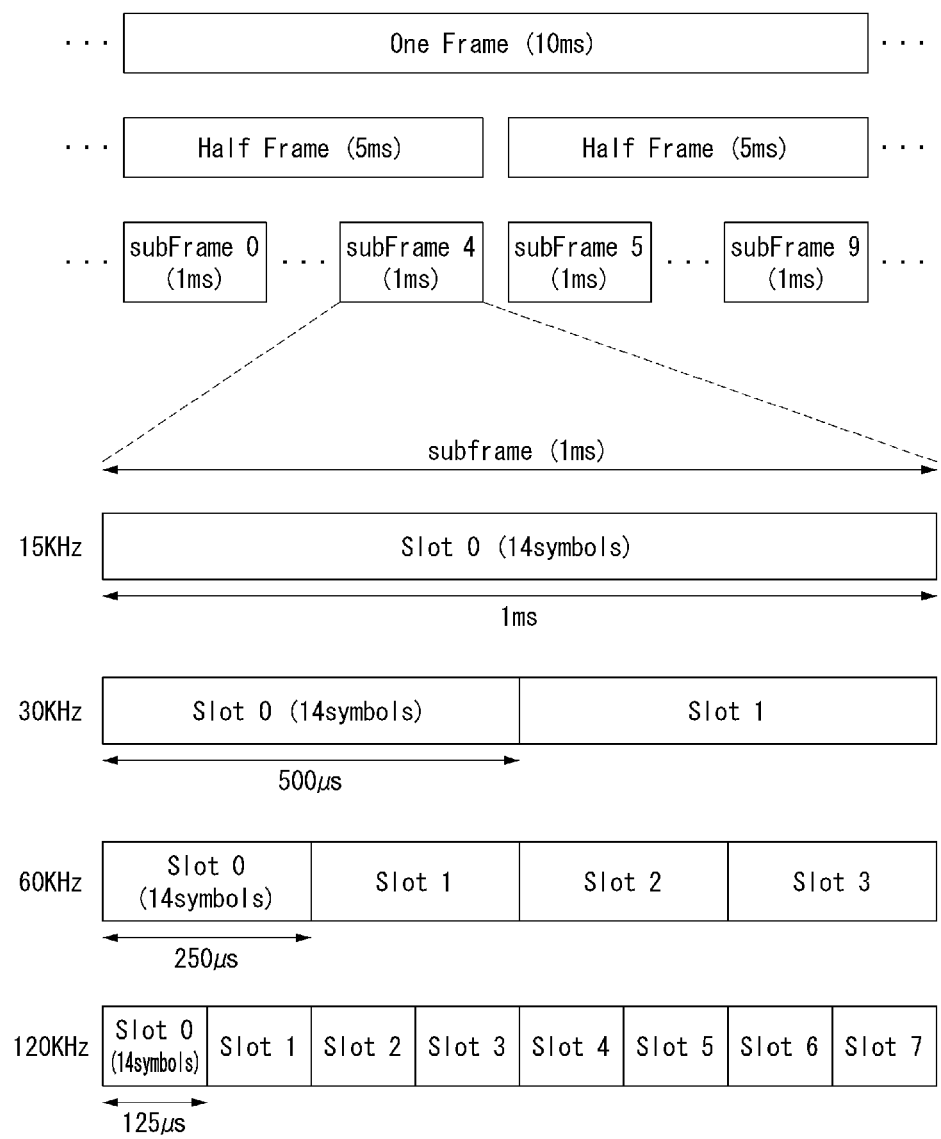
FIG. 2 illustrates a structure of a radio frame of NR according to an embodiment of the present disclosure.

FIG. 2 illustrates a structure of a radio frame of an NR, based on an embodiment of the present disclosure.

Referring to FIG. 2, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols based on a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 3:
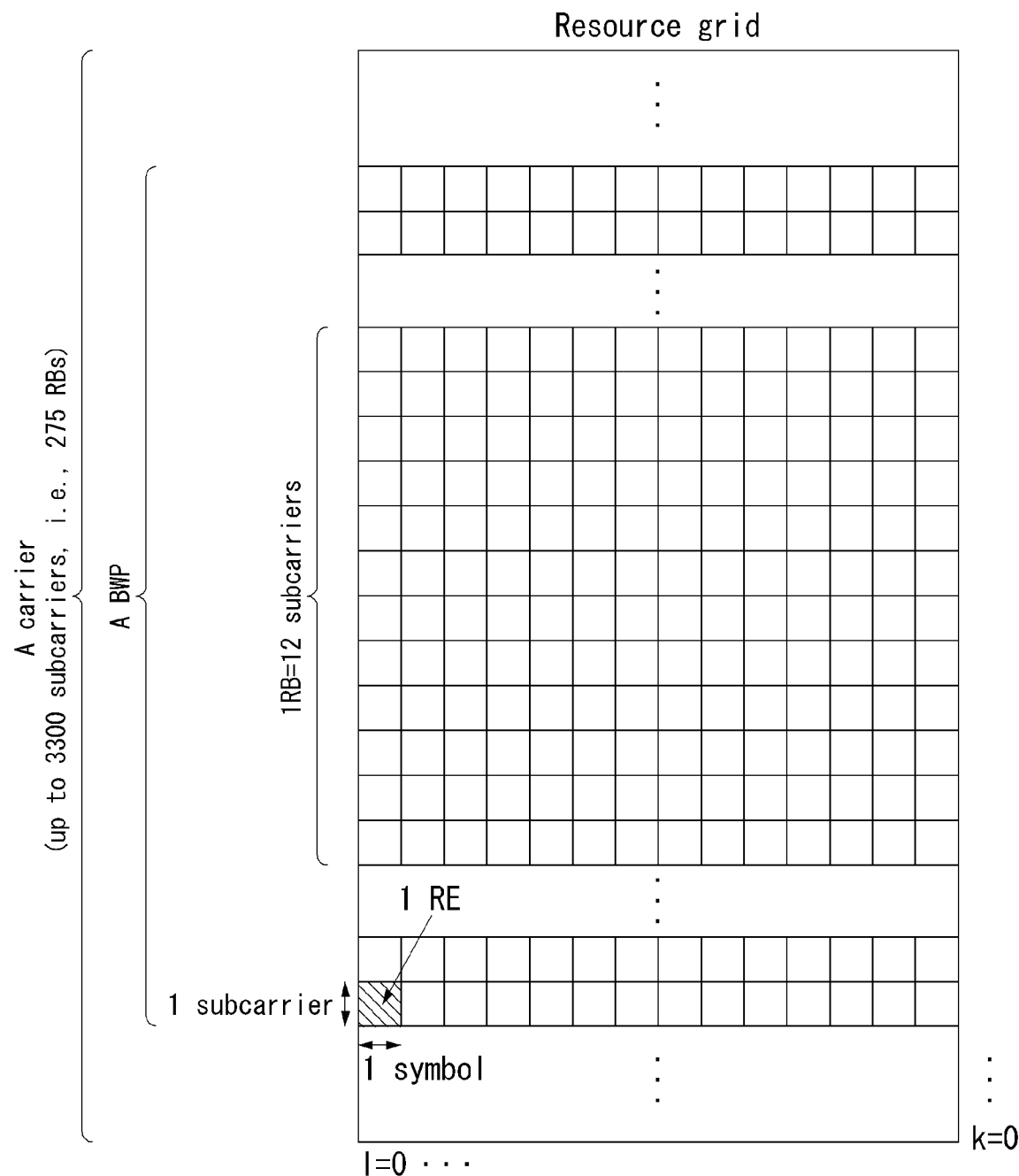
FIG. 3 illustrates a slot structure of an NR frame according to an embodiment of the present disclosure.

FIG. 3 illustrates a structure of a slot of an NR frame, based on an embodiment of the present disclosure.

Referring to FIG. 3, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

A radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a sidelink synchronization signal (SLSS) and synchronization information will be described.

The SLSS may be an SL-specific sequence and include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and/or for synchronization acquisition. For example, the UE may use the S-PSS and the S-SSS for acquisition of fine synchronization and/or for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Meanwhile, a plurality of numerologies having different SCSs and/or CP lengths may be supported in an NR SL system. In this case, a length of a time resource used by a transmitting UE to transmit the S-SSB may be decreased along with an increase in the SCS. Accordingly, coverage of the S-SSB may be decreased. Therefore, in order to ensure the coverage of the S-SSB, the transmitting UE may transmit one or more S-SSBs to a receiving UE within one S-SSB transmission period based on the SCS. For example, the number of S-SSBs transmitted by the transmitting UE to the receiving UE within one S-SSB transmission period may be pre-configured or configured to the transmitting UE. For example, an S-SSB transmission period may be 160 ms. For example, the S-SSB transmission period of 160 ms may be supported for all SCSs.

For example, if the SCS is 15 kHz in FR1, the transmitting UE may transmit 1 or 2 S-SSBs to the receiving UE within one S-SSB transmission period. For example, if the SCS is 30 kHz in FR1, the transmitting UE may transmit 1 or 2 S-SSBs to the receiving UE within one S-SSB transmission period. For example, if the SCS is 60 kHz in FR1, the transmitting UE may transmit 1, 2, or 4 S-SSBs to the receiving UE within one S-SSB transmission period.

For example, if the SCS is 60 kHz in FR2, the transmitting UE may transmit 1, 2, 4, 8, 16, or 32 S-SSBs to the receiving UE within one S-SSB transmission period. For example, if the SCS is 120 kHz in FR2, the transmitting UE may transmit 1, 2, 4, 8, 16, 32, or 64 S-SSBs to the receiving UE within one S-SSB transmission period.

Meanwhile, if the SCS is 60 kHz, two types of CP may be supported. In addition, a structure of an S-SSB transmitted by the transmitting UE to the receiving UE may differ depending on a CP type. For example, the CP type may be normal CP (NCP) or extended CP (ECP). Specifically, for example, if the CP type is the NCP, the number of symbols for mapping a PSBCH within an S-SSB transmitted by the transmitting UE may be 9 or 8. Otherwise, for example, if the CP type is the ECP, the number of symbols for mapping the PSBCH within the S-SSB transmitted by the transmitting UE may be 7 or 6. For example, the PSBCH may be mapped to a first/initial symbol within the S-SSB transmitted by the transmitting UE. For example, the receiving UE which receives the S-SSB may perform an automatic gain control (AGC) operation in a first/initial symbol duration of the S-SSB.

Meanwhile, each SLSS may have an SL sidelink synchronization identifier (SLSS ID).

For example, in case of LTE SL or LTE V2X, a value of the SLSS ID may be defined based on a combination of 2 different S-PSS sequences and 168 different S-SSS sequences. For example, the number of SLSS IDs may be 336. For example, the value of the SLSS ID may be any one of values 0 to 335.

For example, in case of NR SL or NR V2X, the value of the SLSS ID may be defined based on a combination of 2 different S-PSS sequences and 336 different S-SSS sequences. For example, the number of SLSS IDs may be 672. For example, the value of the SLSS ID may be any one of values 0 to 671. For example, one S-PSS out of the 2 different S-PSSs may be associated/related with in-coverage, and the other S-PSS may be associated/related with out-of-coverage. For example, the SLSS IDs 0 to 335 may be used in the in-coverage, and the SLSS IDs 336 to 671 may be used in the out-of-coverage.

Meanwhile, a transmitting UE may need to optimize transmit power based on a characteristic of each signal constituting an S-SSB, to improve S-SSB reception performance of a receiving UE. For example, the transmitting UE may determine a maximum power reduction (MPR) value for each signal based on a peak to average power ratio (PAPR) of each signal constituting the S-SSB. For example, if the PAPR values are different between the S-PSS and S-SSS constituting the S-SSB, the transmitting UE may apply an optimal MPR value for each of the S-PSS and the S-SSS, to improve S-SSB reception performance of the receiving UE. In addition, for example, a transient period may be applied in order for the transmitting UE to perform an amplification operation for each signal. The transient period may preserve a time required when a transmitting-end amplifier of the transmitting UE performs a normal operation at a boundary at which transmit power of the transmitting UE varies. For example, in case of FR1, the transient period may be 10 us. For example, in case of FR2, the transient period may be 5 us. For example, a search window in which the receiving UE detects the S-PSS may be 80 ms and/or 160 ms.

Figure 4:
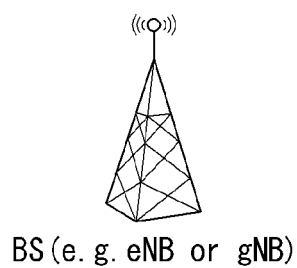
FIG. 4 illustrates a user equipment (UE) performing V2X or SL communication according to an embodiment of the present disclosure.
Figure 4:

FIG. 4 illustrates a UE performing V2X or SL communication based on an embodiment of the present disclosure.

Referring to FIG. 4, in V2X or SL communication, the term 'UE' may generally imply a UE of a user. However, if a network equipment such as a BS transmits/receives a signal based on a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 5:
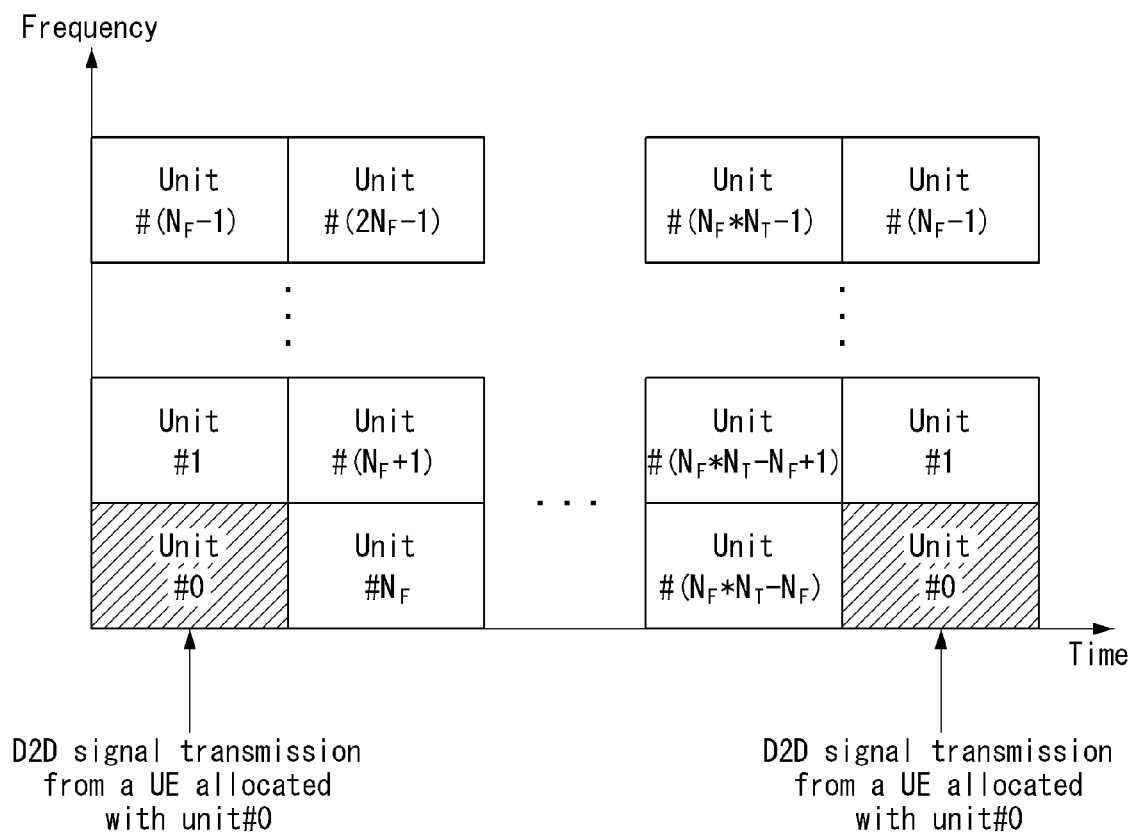
FIG. 5 illustrates unit of resource for V2X or SL communication according to an embodiment of the present disclosure.

FIG. 5 illustrates a resource unit for V2X or SL communication based on an embodiment of the present disclosure.

Referring to FIG. 5, all frequency resources of a resource pool may be divided into $N_F$ resources, and all time resources of the resource pool may be divided into $N_T$ resources. Therefore, $N_F * N_T$ resource units may be defined in the resource pool. FIG. 5 may illustrate an example of a case where a corresponding resource pool is repeated with a period of $N_T$ subframes.

As illustrated in FIG. 5, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Hereinafter, resource allocation in SL will be described.

Figure 6:
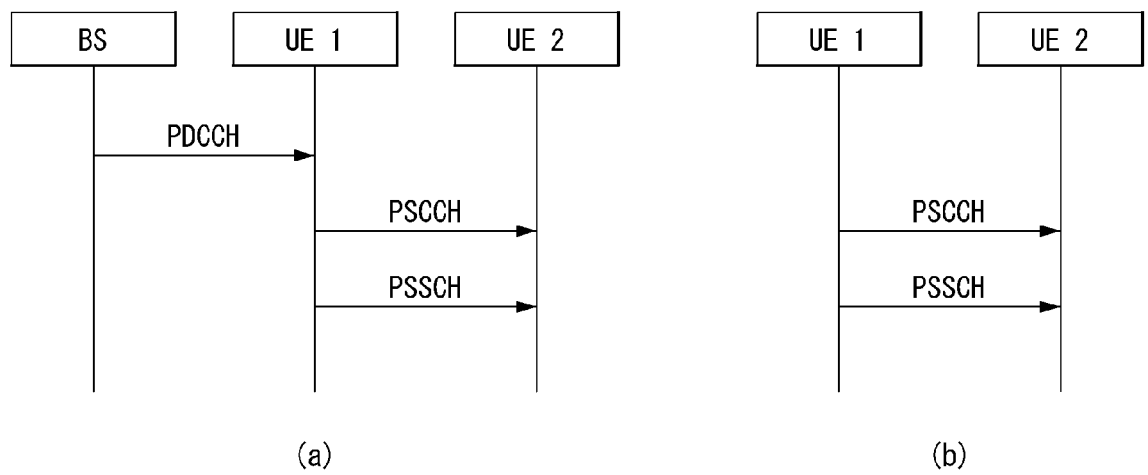
FIG. 6 illustrates a procedure for a UE to perform V2X or SL communication depending on a transmission mode in accordance with an embodiment of the present disclosure.

FIG. 6 illustrates a procedure for a UE to perform V2X or SL communication based on a transmission mode, based on an embodiment of the present disclosure. In various embodiments of the present disclosure, the transmission mode may be referred to as a mode or a resource allocation mode. Hereinafter, for convenience of explanation, in LTE, the transmission mode may be referred to as an LTE transmission mode. In NR, the transmission mode may be referred to as an NR resource allocation mode.

For example, (a) of FIG. 6 illustrates a UE operation related to an LTE transmission mode 1 or an LTE transmission mode 3. Alternatively, for example, (a) of FIG. 6 illustrates a UE operation related to an NR resource allocation mode 1. For example, the LTE transmission mode 1 may be applied to general SL communication, and the LTE transmission mode 3 may be applied to V2X communication.

For example, (b) of FIG. 6 illustrates a UE operation related to an LTE transmission mode 2 or an LTE transmission mode 4. Alternatively, for example, (b) of FIG. 6 illustrates a UE operation related to an NR resource allocation mode 2.

Referring to (a) of FIG. 6, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 based on the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

For example, in the NR resource allocation mode 1, the UE may be provided or allocated with one or more SL transmission resources of one transport block (TB) from the BS through a dynamic grant. For example, the BS may provide the UE with resource for PSCCH and/or PSSCH transmission based on the dynamic grant. For example, a transmitting UE may report to the BS an SL hybrid automatic repeat request (HARQ) feedback received from a receiving UE. In this case, based on an indication within a PDCCH used by the BS to allocate a resource for SL transmission, a PUCCH resource and timing for reporting an SL HARQ feedback to the BS may be determined.

For example, DCI may include information related to a slot offset between DCI reception and first/initial SL transmission scheduled by the DCI. For example, a minimum gap between the DCI for scheduling the SL transmission resource and a first scheduled SL transmission resource may be not less than a processing time of a corresponding UE.

For example, in the NR resource allocation mode 1, for multiple SL transmissions, the UE may be periodically provided or allocated with a resource set from the BS through a configured grant. For example, the configured grant may include a configured grant type 1 or a configured grant type 2. For example, the UE may determine a TB to be transmitted in each of occasions indicated by a given configured grant.

For example, the BS may allocate an SL resource to the UE on the same carrier, or may allocate the SL resource to the UE on a different carrier.

For example, an NR BS may control LTE-based SL communication. For example, the NR BS may transmit NR DCI to the UE to schedule an LTE SL resource. In this case, for example, a new RNTI may be defined to scramble the NR DCI. For example, the UE may include an NR SL module and an LTE SL module.

For example, after the UE including the NR SL module and the LTE SL module receives NR SL DCI from a gNB, the NR SL module may convert the NR SL DCI to an LTE DCI type 5A, and the NR SL module may transfer the LTE DCI type 5A to the LTE SL module in unit of X ms. For example, after the LTE SL module receives the LTE DCI format 5A from the NR SL module, the LTE SL module may apply activation and/or release in a first/initial LTE subframe after Z ms. For example, the X may be dynamically indicated by using a field of DCI. For example, a minimum value of the X may differ depending on UE capability. For example, the UE may report a single value depending on the UE capability. For example, the X may be a positive number.

Referring to (b) of FIG. 6, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selection window by performing a sensing and resource (re)selection procedure. For example, the sensing may be performed in unit of sub-channels. In addition, the UE 1 which has autonomously selected the resource within the resource pool may transmit the SCI to the UE 2 through a PSCCH, and thereafter may transmit data based on the SCI to the UE 2 through a PSSCH.

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re)selection on the basis of the priority. For example, the resource (re)selection procedure may include a step in which the UE 2 identifies a candidate resource in a resource selection window and a step in which the UE 2 selects a resource for (re)transmission among the identified candidate resources. For example, the resource selection window may be a time interval for selecting a resource for SL transmission by the UE. For example, after the UE 2 triggers resource (re)selection, the resource selection window may start at T1≥0, and the resource selection window may be restricted by a remaining packet delay budget of the UE 2. For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re)selection procedure. For example, the transmitting UE may use an SCI related to a first/initial RB to reserve an SL resource for initial transmission of a second TB, based on the sensing and resource (re)selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re)transmissions for one TB may be restricted by a configuration or a pre-configuration. For example, the maximum number of HARQ (re)transmissions may be up to 32. For example, in the absence of the configuration or the pre-configuration, the maximum number of HARQ (re)transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, the UE may use the SCI to indicate to another UE one or more sub-channels and/or slots used by the UE. For example, the UE may use the SCI to indicate to another UE one or more sub-channels and/or slots reserved by the UE for PSSCH (re)transmission. For example, a minimum allocation unit of an SL resource may be a slot. For example, a size of a sub-channel may be configured for the UE or may be pre-configured.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

- PSSCH and/or PSCCH related resource allocation information, e.g., the number/positions of time/frequency resources, resource reservation information (e.g., period), and/or
- SL CSI report request indicator or SL (L1) RSRP (and/or SL (L1) RSRQ and/or SL (L1) RSSI) report request indicator, and/or
- SL CSI transmission indicator (or SL (L1) RSRP (and/or SL (L1) RSRQ and/or SL (L1) RSSI) information transmission indicator)) (on PSSCH), and/or
- MCS information, and/or
- Transmit power information, and/or
- L1 destination ID information and/or L1 source ID information, and/or
- SL HARQ process ID information, and/or
- New data indicator (NDI) information, and/or
- Redundancy version (RV) information, and/or
- (Transmission traffic/packet related) QoS information, e.g., priority information, and/or
- SL CSI-RS transmission indicator or information on the number of (to-be-transmitted) SL CSI-RS antenna ports
- Location information of a transmitting UE or location (or distance region) information of a target receiving UE (for which SL HARQ feedback is requested), and/or
- Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

In various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

Figure 7:
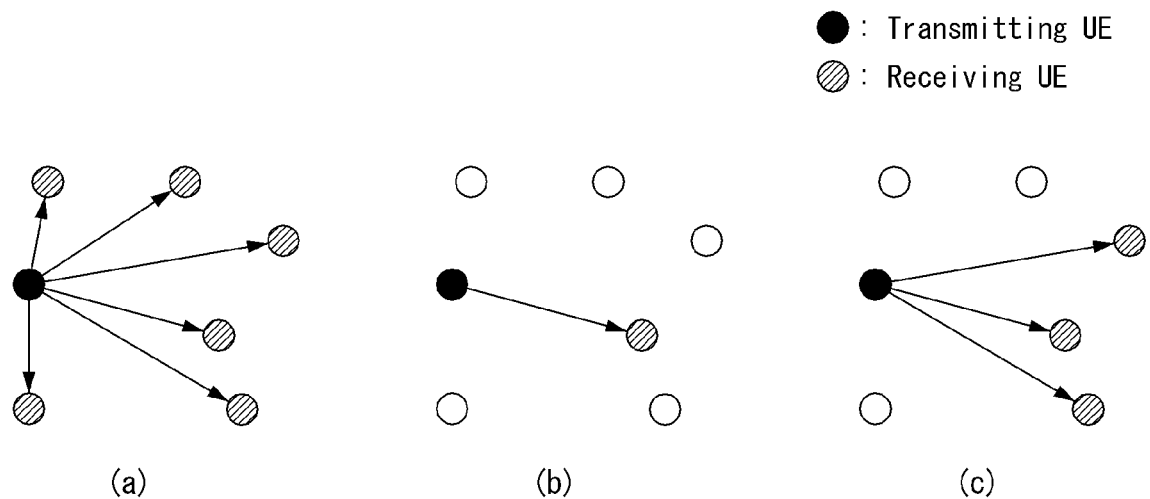
FIG. 7 illustrates three cast types according to an embodiment of the present disclosure.

FIG. 7 illustrates three cast type based on an embodiment of the present disclosure.

Specifically, (a) of FIG. 7 illustrates broadcast-type SL communication, (b) of FIG. 7 illustrates unicast type-SL communication, and (c) of FIG. 7 illustrates groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a bandwidth part (BWP) and a resource pool will be described.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

Figure 8:
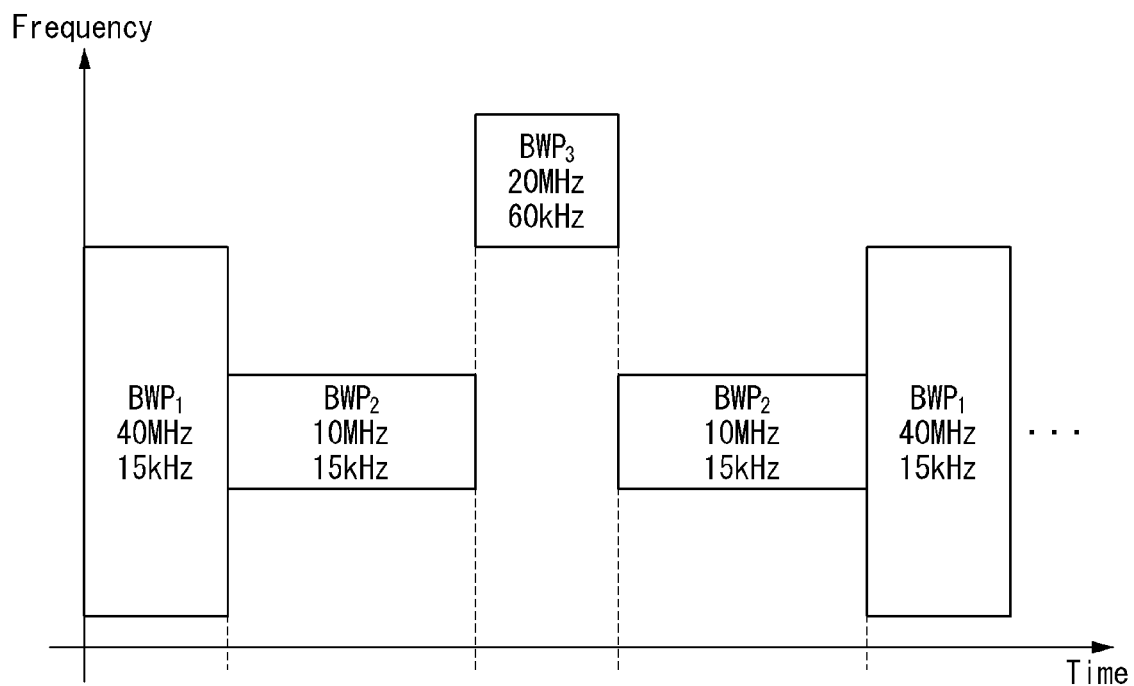
FIG. 8 illustrates a plurality of BWPs according to an embodiment of the present disclosure.

FIG. 8 illustrates a plurality of BWPs based on an embodiment of the present disclosure.

Referring to FIG. 8, a BWP1 having a bandwidth of 40 MHz and a subcarrier spacing of 15 kHz, a BWP2 having a bandwidth of 10 MHz and a subcarrier spacing of 15 kHz, and a BWP3 having a bandwidth of 20 MHz and a subcarrier spacing of 60 kHz may be configured.

Figure 9:
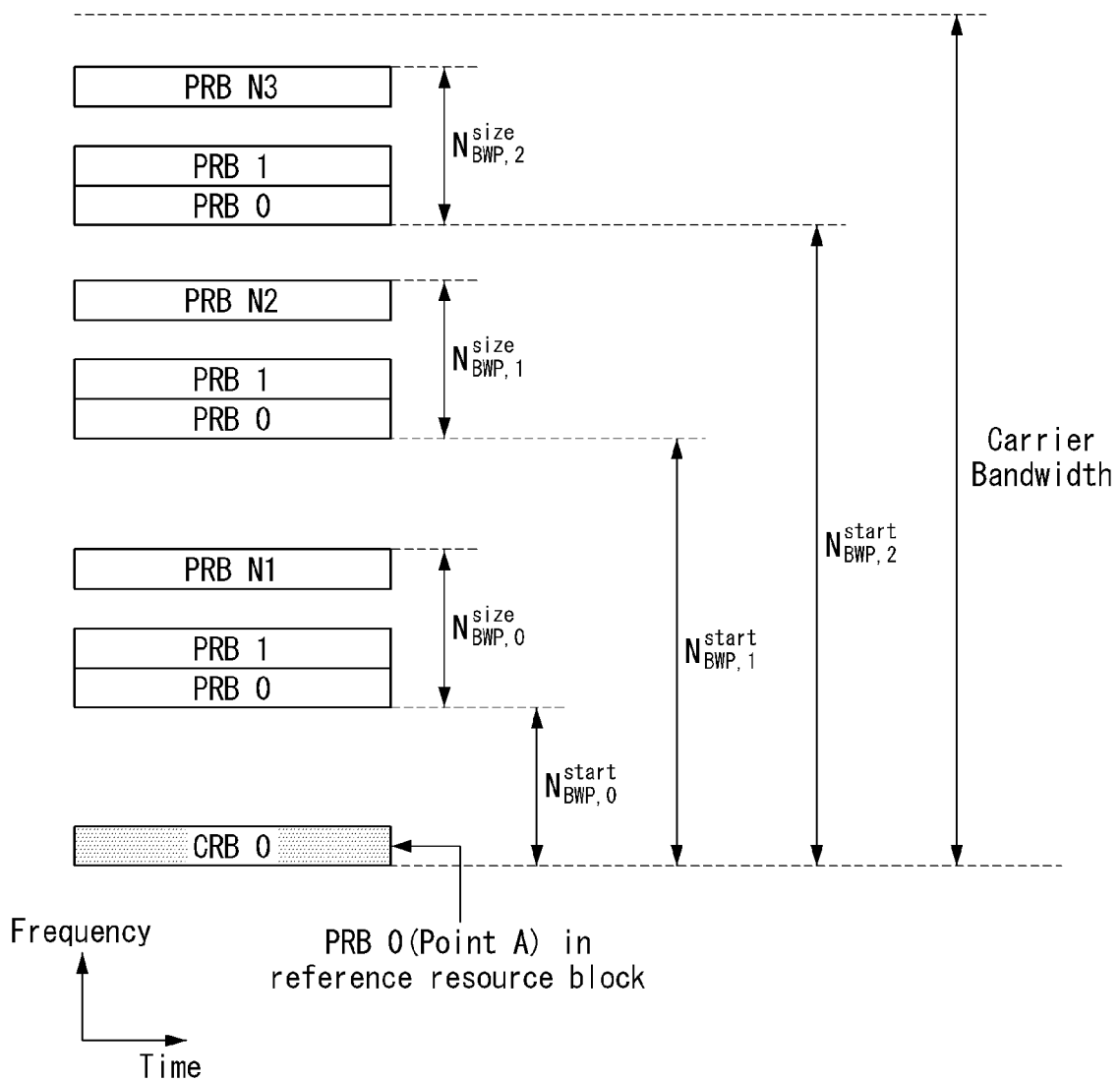
FIG. 9 illustrates a BWP according to an embodiment of the present disclosure.

FIG. 9 illustrates a BWP based on an embodiment of the present disclosure. It is assumed in the embodiment of FIG. 9 that the number of BWPs is 3.

Referring to FIG. 9, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

The BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-) configured in a carrier with respect to an out-of-coverage NR V2X UE and an RRC_IDLE UE. For the UE in the RRC CONNECTED mode, at least one SL BWP may be activated in the carrier.

A resource pool may be a group of time-frequency resources that may be used for SL transmission and/or SL reception. From a perspective of the UE, time-domain resources in the resource pool may not be consecutive. A plurality of resource pools may be (pre-)configured to the UE in one carrier. From a perspective of a physical layer, the UE may perform unicast, groupcast, and broadcast communication by using the configured or pre-configured resource pool.

In the present disclosure, wording of "configuration or definition" may be construed to be (pre-)configured from a base station or a network (via pre-defined signaling (e.g., SIB, MAC signaling, RRC signaling)). For example, "A may be configured" may include "a base station or a network may (pre-)configure/(pre-)define or inform A for a UE". Alternatively, wording of "configuration or definition" may be construed to be pre-configured or pre-defined by a system. For example, "A may be configured" may include "A may be pre-configured/pre-defined by a system".

Hereinafter, the following abbreviations/acronym may be used in the present disclosure for convenience of explanation.

ACK/NACK—Acknowledgement/No Acknowledgement
AGC—Automatic Gain Control
AS—Access Stratum
CB—Codeblock
CBG/CG—Codeblock Group
CBR—Channel Busy Ratio
CE—Control Element
CFO—Carrier Frequency Offset
CG—Configured Grant
CP—Cyclic Prefix
CRC—Cyclic Redundancy Check
CSI—Channel State Information
CSI-RS—Channel State Information Reference Signal
DCI—Downlink Control Channel
DL—Downlink
DM-RS—Demodulation RS
ECP—Extended CP
FDD—Frequency Division Duplex
HARQ—Hybrid Automatic Repeat Request
L1—Layer 1
L2—Layer 2
LBS—Location Based Service
LCS—Location Service
LSB—Least Significant Bit
MAC—Medium Access Control
MCS—Modulation Coding Scheme
MIB—Master Information Block
MPR—Maximum Power Reduction
MSB—Most Significant Bit
NAS—Non-Access Stratum
NCP—Normal CP
NDI—New Data Indicator
PBCH—Physical Broadcast Channel
PDCCH—Physical Downlink Control Channel
PDCP—Packet Data Convergence Protocol
PDSCH—Physical Downlink Shared Channel
PDU—Protocol Data Unit
PRS—Positioning Reference Signal
PSBCH—Physical Sidelink Broadcast Channel
PSCCH—Physical Sidelink Control Channel
PSFCH—Physical Sidelink Feedback Channel
PSS—Primary Synchronization Signal
PSSCH—Physical Sidelink Shared Channel
PUCCH—Physical Uplink Control Channel
PUSCH—Physical Uplink Shared Channel
QoS—Quality of Service
RB—Resource Block
RLC—Radio Link Control
RLM—Radio Link Monitoring
RLF—Radio Link Failure
RRC—Radio Resource Control
RS—Reference Signal
RSRP—Reference Signal Received Power
RSRQ—Reference Signal Received Quality
RSSI—Received Signal Strength Indicator
RSTD—Reference Signal Time Difference
RSU—Road Side Unit
RTT—Round Trip Time
RV—Redundancy Version
SCI—Sidelink Control Information
SCS—Sub-Carrier Spacing
SDAP—Service Data Adaptation Protocol
SIB—System Information Block
SL—Sidelink
SL OLPC—Open Loop Power Control
SL PL—Sidelink Pathloss
SLSSID—SL Synchronization Signal Identification
SNR—Signal-to-Noise Ratio
SPP—Sidelink Positioning Protocol
SPS—Semi-Persistent Scheduling
S-PSS—Sidelink PSS
SRS—Sounding Reference Signal
SSB—Synchronization Signal Block
SSS—Secondary Synchronization Signal
S-SSB—Sidelink SSB
S-SSS—Sidelink SSS
TB—Transport Block
TDD—Time Division Duplex
TDOA—Time Difference of Arrival
TOA—Time of Arrival
UE—User Equipment/End
UL—Uplink
Uu-PSS—Uu link PSS
Uu-SSS—Uu link SSS
XOR—Exclusive OR In the present disclosure, for example, a transmitting UE (TX UE) may be a UE that transmits data to a (target) receiving UE (RX UE). For example, the TX UE may be a UE that performs PSCCH and/or PSSCH transmission. And/or, the TX UE may be a UE that transmits SL CSI-RS and/or SL CSI reporting request indicator to the (target) RX UE. And/or, the TX UE may be a UE that transmits a (control) channel (e.g., PSCCH, PSSCH, etc.) and/or a reference signal (e.g., DM-RS, CSI-RS, etc.) on the (control) channel, to be used for SL RLM and/or SL RLF operation of the (target) RX UE.

In the present disclosure, for example, the receiving UE (RX UE) may be a UE that transmits an SL HARQ feedback to the TX UE depending on whether decoding of data received from the TX UE is successful and/or whether detection/decoding of the PSCCH (related to PSSCH scheduling) transmitted by the TX UE is successful. And/or, the RX UE may be a UE that performs SL CSI transmission on the TX UE based on the SL CSI-RS and/or SL CSI reporting request indicator received from the TX UE. And/or, the RX UE may be a UE that transmits, to the TX UE, an SL (L1) RSRP measurement value measured based on a (pre-defined) reference signal and/or SL (L1) RSRP reporting request indicator received from the TX UE. And/or, the RX UE may be a UE that transmits data of the RX UE itself to the TX UE. And/or, the RX UE may be a UE that performs the SL RLM and/or SL RLF operation based on a (pre-configured) (control) channel received from the TX UE and/or a reference signal on the (control) channel.

In the present disclosure, for example, when the RX UE transmits SL HARQ feedback information for the PSSCH and/or PSCCH received from the TX UE, the following options or some of the following options may be considered. For example, the following options or some of the following options may also be limitedly applied only to when the RX UE successfully decodes/detects the PSCCH for scheduling the PSSCH.

Option 1) The RX UE may transmit NACK information to the TX UE only if the RX UE fails in decoding/reception of the PSSCH received from the TX UE.

Option 2) The RX UE may transmit ACK information to the TX UE if the RX UE succeeds in decoding/reception of the PSSCH received from the TX UE, and may transmit NACK information to the TX UE if the RX UE fails in decoding/reception of the PSSCH.

In the present disclosure, for example, the TX UE may transmit, to the RX UE, the following information or part of the following information via SCI. For example, the TX UE may transmit part or all of the following information to the RX UE via first SCI and/or second SCI.

PSSCH (and/or PSCCH) related resource allocation information (e.g., time/frequency resource location/number, resource reservation information (e.g., periodicity))

SL CSI reporting request indicator or SL (L1) RSRP (and/or SL (L1) RSRQ and/or SL (L1) RSSI) reporting request indicator SL CSI transmission indicator (on PSSCH) (or SL (L1) RSRP (and/or SL (L1) RSRQ and/or SL (L1) RSSI) information transmission indicator)

MCS information

TX POWER information

L1 DESTINATION ID information and/or L1 SOURCE ID information

SL HARQ PROCESS ID information

NDI information

RV information (Transmission TRAFFIC/PACKET related) QoS information (e.g., PRIORITY information)

SL CSI-RS transmission indicator or information on the number of (transmitted) SL CSI-RS antenna ports Location information of the TX UE or location (or distance area) information of a target RX UE (requesting SL HARQ feedback)

Reference signal (e.g., DM-RS, etc.) information related to decoding (and/or channel estimation) of data transmitted via the PSSCH. For example, the reference signal information may be information related to a pattern of (time-frequency) mapping resources of DM-RS, RANK information, antenna port index information, etc.

In the present disclosure, for example, since the TX UE can transmit the SCI, the first SCI, and/or the second SCI to the RX UE via the PSCCH, the PSCCH may be replaced/substituted with the SCI and/or the first SCI and/or the second SCI. And/or, the SCI may be replaced/substituted with the PSCCH and/or the first SCI and/or the second SCI. And/or, for example, since the TX UE can transmit the second SCI to the RX UE via the PSSCH, the PSSCH may be replaced/substituted with the second SCI.

In the present disclosure, for example, when SCI configuration fields are divided into two groups considering a (relatively) high SCI payload size, first SCI including a first SCI configuration field group may be referred to as FIRST SCI, and second SCI including a second SCI configuration field group may be referred to as SECOND SCI. For example, the FIRST SCI may be transmitted to the RX UE via the PSCCH. For example, the SECOND SCI may be transmitted to the RX UE via (standalone) PSCCH or piggybacked and transmitted jointly with data via the PSSCH.

In the present disclosure, for example, "configuration" or "definition" may mean (PRE)CONFIGURATION (resource pool specifically) (via pre-defined signaling (e.g., SIB, MAC, RRC, etc.)) from the base station or the network.

In the present disclosure, for example, since RLF can be determined based on an OUT-OF-SYNCH (OOS) indicator or an IN-SYNCH (IS) indicator, the RLF may be replaced/substituted with OUT-OF-SYNCH (OOS) or IN-SYNCH (IS).

In the present disclosure, for example, RB may be replaced/substituted with SUBCARRIER. Further, as one example, in the present disclosure, PACKET or TRAFFIC may be replaced/substituted with TB or MAC PDU based on a transmitted layer.

In the present disclosure, CBG or CG may be replaced/substituted with TB.

In the present disclosure, for example, SOURCE ID may be replaced/substituted with DESTINATION ID.

In the present disclosure, for example, L1 ID may be replaced/substituted with L2 ID. For example, L1 ID may be L1 SOURCE ID or L1 DESTINATION ID. For example, L2 ID may be L2 SOURCE ID or L2 DESTINATION ID.

In the present disclosure, for example, an operation of the transmitting UE to reserve/select/determine retransmission resources may mean an operation of the transmitting UE to reserve/select/determine potential retransmission resources whose actual use will be determined based on the SL HARQ feedback information received from the receiving UE.

In the present disclosure, SL MODE 1 may mean a resource allocation scheme or a communication scheme in which the base station directly schedules a sidelink transmission (SL TX) resource of the UE via pre-defined signaling (e.g., DCI). Further, for example, SL MODE 2 may mean a resource allocation scheme or a communication scheme in which the UE independently selects the SL TX resource within a resource pool configured or pre-configured from the base station or the network.

In the present disclosure, for example, for convenience of explanation, a (physical) channel which the RX UE uses when transmitting at least one of the following information to the TX UE may be referred to as a PSFCH.

SL HARQ feedback, SL CSI, SL (L1) RSRP

The base station may allocate the UE a resource (hereinafter, SL resource) used for the transmission and reception of SL channel/signal. For example, the base station may transmit information related to the resource to the UE. In the present disclosure, a scheme in which the base station allocates the SL resource to the UE may be referred to as a mode 1 scheme, a mode 1 operation, or a resource allocation mode 1.

On the other hand, the UE may select the SL resource within the resource pool based on the sensing. In the present disclosure, a scheme in which the UE selects the SL resource may be referred to as a mode 2 scheme, a mode 2 operation, or a resource allocation mode 2. For example, in the resource allocation mode 2, the UE may detect SCI transmitted by another UE, and/or the UE may identify a resource reserved by another UE based on the SCI, and/or the UE may obtain an RSRP measurement value. And/or, the UE may select a resource to be used for the SL transmission except for a specific resource within a resource selection window based on a result of the sensing. In the sensing operation, the UE may refer to resource allocation information received via the first SCI. However, because of an overhead of the first SCI, an amount of information which the UE can acquire on the first SCI may be limited.

According to various embodiments of the present disclosure, a second UE may transmit additional assistance information in order to assist a sensing operation and/or a resource selection operation of a first UE. For PSSCH detection performance improvement and/or half-duplex limit reduction and/or reserved resource selection for transmission and reception of a specific signal, etc., the first UE may use the assistance information received from the second UE. In an embodiment of the present disclosure, for convenience of explanation, it is assumed that a UE-A transmits assistance information to a UE-B. It is also assumed that the UE-B selects a resource for PSCCH/PSSCH to be transmitted to the UE-A and/or a resource for PSCCH/PSSCH to be transmitted to a UE-C (i.e., a third UE) based on the assistance information received from the UE-A.

Figure 10:
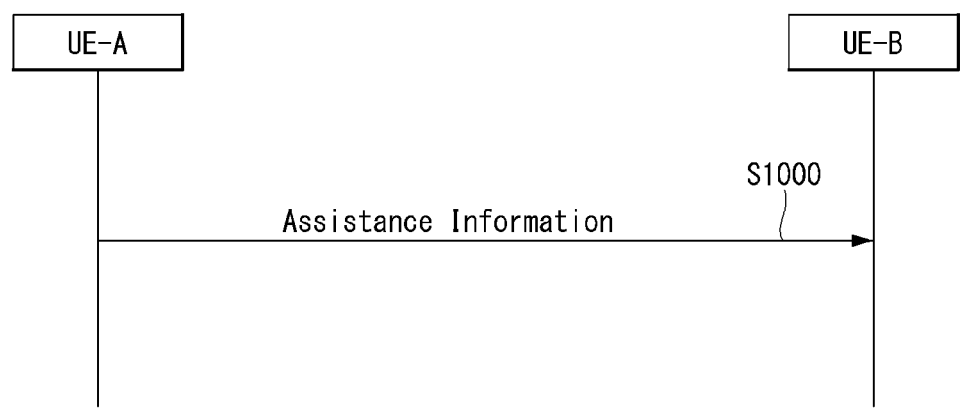
FIG. 10 illustrates a procedure for a UE-A to transmit assistance information to a UE-B in accordance with an embodiment of the present disclosure.

FIG. 10 illustrates a procedure for a UE-A to transmit assistance information to a UE-B in accordance with an embodiment of the present disclosure. An implementation of FIG. 10 can be combined with various embodiments of the present disclosure.

Referring to FIG. 10, in step S1000, the UE-A may transmit assistance information to the UE-B. For example, the UE-B (e.g., a first UE) may select a resource for PSCCH/PSSCH to be transmitted to the UE-A based on the assistance information received from the UE-A (e.g., a second UE). And/or, the UE-B may perform SL transmission using the resource. For example, the UE-B may select a resource for PSCCH/PSSCH to be transmitted to the UE-C based on the assistance information received from the UE-A, and the UE-B may perform SL transmission using the resource. In the present disclosure, the assistance information may be referred to as additional information.

Hereinafter, the present disclosure describes a method of transmitting a resource conflict indicator (hereinafter, first embodiment), a method of omitting a resource reselection when receiving a resource conflict indicator (hereinafter, second embodiment), a method of performing a resource reselection when receiving a resource conflict indicator (hereinafter, third embodiment), and a method of performing a decoding with only received data acquired based on retransmission.

Embodiments described below in the present disclosure are merely distinguished for convenience of explanation. Thus, it is obvious that partial method and/or partial configuration of any embodiment can be substituted or combined with partial method and/or partial configuration of another embodiment.

A slot, a subframe, a frame, etc. described in embodiments of the present disclosure may be examples of predetermined time units used in a wireless communication system. That is, when applying methods described in the present disclosure, time unit may be replaced by other time units applied to other wireless communication systems.

In the present disclosure, L1 signaling may mean DCI-based dynamic signaling between a base station and a UE, and L2 signaling may mean higher layer signaling based on radio resource control (RRC)/medium access control-control element (MAC-CE) between a base station and a UE.

The contents described above (3GPP system, NR system, radio frame structure/slot structure of NR, etc.) can be combined with methods proposed in the present disclosure to be described below, and/or supplemented to clarify technical features of the methods proposed in the present disclosure.

In the present disclosure, '( )' can be interpreted as both when excluding content in ( ) and when including content in parentheses. And/or, in the present disclosure, '( )' may mean a group of elements (or contents) in parentheses, and/or may mean the abbreviation/full name of the term before parentheses, and/or may mean writing contents before parentheses in English.

In the present disclosure, '/' can be interpreted as both when including all the contents separated by '/' (and) and when including only a part of the separated contents (or).

A first embodiment is first described.

First Embodiment

This embodiment describes a method of transmitting a resource conflict indicator.

Methods to be described below are merely distinguished for convenience of explanation. Thus, it is obvious that configuration of any method can be substituted or combined with configuration of another method.

When a UE-A transmits a preferred or non-preferred resource for transmission in order to assist resource selection of the UE-A, the preferred and/or non-preferred resource and/or information for the preferred and/or non-preferred resource may be transmitted via PSCCH/PSSCH based on an amount of information. In this instance, the UE-A may perform resource (re)selection by itself to secure the PSCCH/PSSCH resource. This may reduce efficiency of a resource reselection method using assistance information. There may occur problems in which PSCCH/PSSCH transmission including the assistance information again increases a level of congestion, or a half-duplex problem occurs due to the transmission.

According to an embodiment of the present disclosure, the UE-A may transmit, to a UE-B, information or an indicator triggering the resource reselection. For example, the resource reselection indicator or a resource conflict indicator may be transmitted by the UE-A to the UE-B via a PSFCH resource or in the form of PSFCH format. In the present disclosure, the resource conflict indicator may be referred to as conflict information.

According to an embodiment of the present disclosure, the PSFCH resource or a PSFCH candidate set for the resource conflict indicator may be (pre-)configured independently from PSFCH resource configuration for SL HARQ-ACK. Alternatively, the PSFCH resource or PSFCH candidate set for the resource conflict indicator may be configured between UEs via PC5-RRC. According to an embodiment of the present disclosure, the PSFCH resource or PSFCH candidate set for the resource conflict indicator may be one that inherits all or part (e.g., PSFCH resource period) of PSFCH resource configuration for SL HARQ-ACK, and/or PSFCH state (ACK or NACK, m_CS value) may be (pre-)configured separately or configured via PC5-RRC. For example, a PSFCH resource period for the resource conflict indicator may be equal to and/or greater than a PSFCH resource period for SL HARQ-ACK.

And/or, the UE-A sending the resource conflict indicator to the UE-B may be a legitimate recipient of PSCCH/PSSCH transmitted by the UE-B, or may be a third UE.

And/or, if the frequency of transmitting the resource conflict indicator increases, the efficiency of the system may be reduced as an occasion to transmit or receive SL HARQ-ACK for data communication decreases from a UE-A perspective. Further, based on a relationship between the UE-A transmitting the resource conflict indicator and the UE-B and/or a relationship between the UE-A and the legitimate recipient of the UE-B, understandings of resource conflict may vary. In other words, if the UE-A is a third party not a recipient of the UE-B, the resource conflict determined by the UE-A may not be a resource conflict from a perspective of an actual reception UE of the UE-B. In this case, the resource reselection of the UE-B may be an unnecessary operation. Hence, there is a need to determine a case where the UE-A decides the resource conflict and/or a condition where the UE-A sends the resource conflict indicator.

According to an embodiment of the present disclosure, the resource conflict may be a case where all or some of different PSCCH and/or PSSCH resources overlap, and/or a case where all or some of reserved resources indicated in different SCIs overlap, and/or a case where different PSCCHs/PSSCHs have been transmitted or reserved in the same slot and are legitimate recipients of each other. And/or, the resource conflict may be the half-duplex problem, when SOURCE ID and DESTINATION ID of one SCI are DESTINATION ID and SOURCE ID of another SCI, or when DESTINATION IDs of a plurality of SCIs in a groupcast is the same.

For example, if the UE-A determines resource conflict for PSCCH/PSSCH transmitted by a single UE-B or a plurality of UEs-B, the UE-A may send the resource conflict indicator to all or some of the UEs-B corresponding to the resource conflict only in a specific situation.

For example, the specific situation may be a case where the UE-A detects all or some of second SCIs corresponding to the resource conflict. For example, the specific situation may be a case where the UE-A detects at least two second SCIs corresponding to the resource conflict. In particular, the detection of the second SCI including L1-SOURCE ID and L1-DESTINATION ID needs to be preceded in order to decide the half-duplex problem.

For example, the specific situation may be a case where the UE-A succeeds in decoding all or some of TBs or PSSCHs corresponding to the resource conflict. For example, the specific situation may be a case where the UE-A succeeds in decoding at least two TBs or PSSCHs corresponding to the resource conflict. For example, a success time of the decoding may be time corresponding to the resource conflict, or may include a case in which the UE-A succeeds in receiving and decoding PSSCH for the same TB before time of the resource conflict. In particular, in order to decide the half-duplex problem, the PSSCH decoding needs to be preceded so that L2-SOURCE ID and L2-DESTINATION ID can be acquired.

And/or, if the UE-A is a receiving UE of the UE-B, whether to transmit SL HARQ-ACK and the state determination and/or an operation method upon the retransmission reception may be based on L1-SOURCE ID and/or L1-DESTINATION ID. The half-duplex problem may occur even between a groupcast PSSCH and a unicast PSSCH. For example, when the UE-A recognizes that a UE transmitting the unicast PSSCH is a receiving UE of the groupcast transmitted at the same time, the UE-A may decide that the half-duplex problem has occurred. For example, a situation recognized by the UE-A as above may be a case where the UE-A uses L1 or L2 SOURCE ID corresponding to the unicast PSSCH and receives PSCCH and/or PSSCH using L1 or L2 DESTINATION ID corresponding to the groupcast PSSCH. For example, the situation may be a case where the UE-A determines that the half-duplex problem has occurred when L1 or L2 DESTINATION ID corresponding to the unicast PSSCH is the same as L1 or L2 SOURCE ID corresponding to the groupcast PSSCH.

For example, the specific situation may be a case where a distance between the UE-A and all or some of the transmitting UEs corresponding to the resource conflict is equal to or less than a predetermined level. For example, the specific situation configuration based on the distance may be limited to a case where the transmitting UEs corresponding to the resource conflict use SCI format 2-B (including location information or ZONE ID information). For example, when resource conflict occurs between PSSCHs transmitted by a UE-B-1 and a UE-B-2, if a distance between the UE-A and the UE-B-1 is equal to or less than a specific threshold ((pre-)set value or COMMUNICATION RANGE REQUIREMENT value indicated in SCI transmitted by the UE-B-1), and/or if a distance between the UE-A and the UE-B-2 is equal to or less than a specific threshold ((pre-)set value or COMMUNICATION RANGE REQUIREMENT value indicated in SCI transmitted by the UE-B-2), and/or if a distance between the UE-B-1 and the UE-B-2 is equal to or less than a specific threshold ((pre-)set value or COMMUNICATION RANGE REQUIREMENT value indicated in SCI transmitted by the UE-B-1 or COMMUNICATION RANGE REQUIREMENT value indicated in SCI transmitted by the UE-B-2 or a maximum value or a minimum value or a mean value of the COMMUNICATION RANGE REQUIREMENT values), the UE-A may transmit a resource conflict indicator for the resource conflict.

For example, if a distance between the UE-A and the UE-B-1 is equal to or less than a predetermined level and a distance between the UE-A and the UE-B-2 is equal to or greater than the predetermined level, the UE-A may determine that the resource conflict has not occurred between the PSSCHs transmitted by the UE-B-1 and the UE-B-2. For example, based on the prediction of the UE-A, if a distance from the UE-B-1 to the UE-B-2 is equal to or less than the COMMUNICATION RANGE REQUIREMENT value indicated in SCI transmitted by the UE-B-1 and a distance from the UE-B-2 to the UE-B-1 is equal to or greater than the COMMUNICATION RANGE REQUIREMENT value indicated in SCI transmitted by the UE-B-2, the UE-A may determine that the resource conflict between the PSSCHs transmitted by the UE-B-1 and the UE-B-2 has occurred only in the UE-B-2. That is, in the above situation, the UE-A may determine that the resource conflict between the PSSCHs transmitted by the UE-B-1 and the UE-B-2 has not occurred from a UE-B-1 perspective.

For example, the distance measurement may be a value obtained by measuring a distance between a center of a ZONE indicated in the second SCI and an actual location of the UE-A. For example, the distance measurement may be a value obtained by measuring a distance between the center of the ZONE indicated in the second SCI and a center of a ZONE to which the UE-A belongs. For example, configuration of the ZONE for the UE-A may have the same configuration as the ZONE indicated in the second SCI that is a target of the distance measurement.

For example, a distance value between the UE-B-1 and the UE-B-2 measured at an end of the UE-A may be a distance from the center of the ZONE that each UE indicates in the SCI. For example, configuration of the ZONE assumed between the UE-B-1 and the UE-B-2 may vary. For example, the distance value between the UE-B-1 and the UE-B-2 measured at the UE-A end may be a maximum value or a minimum value or a mean value of the ZONEs that the respective UEs indicate in the SCI. For example, the distance value between the UE-B-1 and the UE-B-2 measured at the UE-A end may be a maximum value or a minimum value or a mean value of a possible distance between a center of a ZONE indicated by the UE-B-1 and a ZONE indicated by the UE-B-2. For example, the distance value between the UE-B-1 and the UE-B-2 measured at the UE-A end may be a maximum value or a minimum value or a mean value of a possible distance between a center of a ZONE indicated by the UE-B-2 and a ZONE indicated by the UE-B-1.

For example, the UE-A may transmit a resource conflict indicator only when the UE-B-1 and the UE-B-2 belong to the same ZONE. For example, only when the UE-B-1 and the UE-B-2 indicate COMMUNICATION RANGE REQUIREMENT of the same value, the UE-A may transmit the resource conflict indicator. For example, the value of COMMUNICATION RANGE REQUIREMENT indicated by the UE-B-1 and/or the UE-B-2 may be equal to or less than a (pre)set threshold. This indicates that resource (re) selection based on the resource conflict indicator may be inefficient when the value of COMMUNICATION RANGE REQUIREMENT is large.

For example, the specific situation may be a case where reception quality (e.g., RSRP measurement value, RSRQ measurement value, RSSI measurement value, and/or SINR estimate value) of PSCCHs and/or PSSCHs transmitted by all or some of the transmitting UEs corresponding to the resource conflict is equal to or greater than a predetermined level. For example, when the resource conflict occurs between PSSCHs transmitted by the UE-B-1 and the UE-B-2, the UE-A may transmit the resource conflict indicator for the resource conflict, if a PSCCH and/or PSSCH DMRS based RSRP measurement value transmitted by the UE-B-1 is equal to or greater than a specific threshold ((pre)set value), and/or if a PSCCH and/or PSSCH DMRS based RSRP measurement value transmitted by the UE-B-2 is equal to or greater than a specific threshold ((pre)set value), and/or if a difference between the RSRP measurement values measured from the UE-B-1 and the UE-B-2 is equal to or less than a specific threshold ((pre)set value). For example, the difference between the RSRP measurement values measured from the UE-B-1 and the UE-B-2 may be 'the RSRP value measured from the UE-B-2'-'the RSRP value measured from the UE-B-1', or 'the RSRP value measured from the UE-B-1'-'the RSRP value measured from the UE-B-2', or an absolute value of the difference between the RSRP measurement values measured from the UE-B-1 and the UE-B-2.

For example, all or some of the specific thresholds may be differently set depending on an MCS value indicated in SCI corresponding to the resource conflict, or a coding rate, or a data rate, and/or a modulation order. For example, all or some of the specific thresholds may be differently (pre)set for each congestion control level. For example, all or some of the specific thresholds may be differently (pre)set depending on a priority value indicated in SCI corresponding to the resource conflict, or a combination of these values. That is, for example, even if the UE-A decides the resource conflict, the UE-A may determine that an effect of the resource conflict is insignificant if the specific situation is not satisfied, and may not separately transmit the resource conflict indicator.

For example, the specific situation may be a case where a priority value of PSCCHs and/or PSSCHs transmitted by all or some of the transmitting UEs corresponding to the resource conflict is equal to or less than a predetermined level. For example, when the resource conflict occurs between PSSCHs transmitted by the UE-B-1 and the UE-B-2, the UE-A may transmit the resource conflict indicator for the resource conflict, if a priority value of PSCCH and/or PSSCH transmitted by the UE-B-1 is equal to or less than a specific threshold ((pre)set value), and/or if a priority value of PSCCH and/or PSSCH transmitted by the UE-B-2 is equal to or less than a specific threshold ((pre)set value), and/or if a difference between the priority values of PSCCHs and/or PSSCHs transmitted by the UE-B-1 and the UE-B-2 is equal to or less than a specific threshold ((pre)set value).

For example, the specific situation may be a case where the UE-A determines that PRE-EMPTION occurs for PSCCHs and/or PSSCHs transmitted by all or some of the transmitting UEs corresponding to the resource conflict. For example, when the resource conflict occurs between PSSCHs transmitted by the UE-B-1 and the UE-B-2, the UE-A may transmit the resource conflict indicator to the UE-B-2, if the priority value of PSSCH transmitted by the UE-B-2 is less than the priority value of PSSCH transmitted by the UE-B-1, and/or if the priority value of PSSCH transmitted by the UE-B-2 is less than a (pre)set threshold. For example, when the resource conflict occurs between PSSCHs transmitted by the UE-B-1 and the UE-B-2, the UE-A may transmit the resource conflict indicator to the UE-B-1, if the priority value of PSSCH transmitted by the UE-B-1 is less than the priority value of PSSCH transmitted by the UE-B-2, and/or if the priority value of PSSCH transmitted by the UE-B-1 is less than a (pre)set threshold.

For example, the specific situation may be a case where an MCS value indicated in SCI transmitted by all or some of the transmitting UEs corresponding to the resource conflict, and/or a data rate value (e.g., product of a coding rate value and a modulation order), and/or a coding rate vale are equal to or greater than a predetermined level. This is that a reduction in performance due to the resource conflict may increase when the MCS value is equal to or greater than a predetermined level. For example, the predetermined level may be (pre)set per resource pool, and/or per service type, and/or per priority value, and/or per priority value pair corresponding to the resource conflict, and/or per QoS parameter.

For example, the specific situation may be a case where a received power of PSFCH for PS SCH transmitted by all or some of the transmitting UEs corresponding to the resource conflict is equal to or greater than a predetermined level. A reason for this is that the receiving UE of each transmitting UE causing the resource conflict may be in an environment in which they can be viewed as being under the influence of each other. For example, when the resource conflict occurs between PSSCHs transmitted by the UE-B-1 and the UE-B-2, the UE-A may transmit the resource conflict indicator for the resource conflict, if a received power value of PSFCH corresponding to PSSCH transmitted by the UE-B-1 is equal to or greater than a specific threshold ((pre)set value), and/or if a received power value of PSFCH corresponding to PSSCH transmitted by the UE-B-2 is equal to or greater than a specific threshold ((pre)set value), and/or if a difference between the received power values of PSFCHs measured from the UE-B-1 and the UE-B-2 is equal to or less than a specific threshold ((pre)set value).

For example, all or some of the specific thresholds may be differently set depending on an MCS value indicated in SCI corresponding to the resource conflict, or a coding rate, or a data rate, and/or a modulation order. For example, all or some of the specific thresholds may be differently set depending on the RSRP value or range measured by the UE-A based on PSCCH and/or PSSCH DMRS corresponding to the resource conflict.

For example, the PSFCH received power value may be an average received power for all or some of REs to which PSFCH is mapped. For example, if an SL HARQ-ACK feedback method for PSSCH for the resource conflict is groupcast option 1 (NACK-ONLY), the RSRP measurement value measured by the UE-A may be normalized again to the maximum number of simultaneous PSFCH transmission or a (pre)set scaling value. For example, if an SL HARQ-ACK feedback method for PSSCH for the resource conflict is groupcast option 2 (NACK-ONLY), a maximum value, or a minimum value, or a mean value of received power values for PSFCH resources for each PSSCH corresponding to the resource conflict may be a received power value of a final PSFCH. For example, the mean value may be a mean value for the PSFCH received power values that are equal to or greater than a (pre)set threshold. This is because the UE-A end may fail to recognize which UE transmits PSFCH for the groupcast PSSCH.

According to an embodiment of the present disclosure, the UE-A transmits the resource conflict indicator if the specific condition or its combination from at least one UE corresponding to the resource conflict is satisfied, and a target UE of the indicator may be a UE satisfying the specific condition.

According to an embodiment of the present disclosure, the UE-A may determine the determination of the resource conflict and the transmission of the resource conflict indicator based on SCI detected in a slot in which the resource conflict occurs. According to an embodiment of the present disclosure, the UE-A may determine the determination of the resource conflict and the transmission of the resource conflict indicator for a reserved resource indicated in SCI detected in a previous slot not a slot in which the resource conflict occurs. For example, even if the UE-A fails to detect SCI in the reserved resource in the previously received SCI, the UE-A may determine the resource conflict and transmit the resource conflict indicator for the reserved resource according to the above specific situation.

And/or, the UE-A transmitting the resource conflict indicator may attempt to detect the same group of groupcast or the same (L1-)DESTINATION ID as the UE-B corresponding to the resource conflict. That is, in other words, the UE-A may be one of receiving UEs of groupcast PSSCH transmitted by the UE-B.

For example, if the UE-A fails to decode the groupcast PSSCH transmitted by the UE-B, the UE-A may not transmit the resource conflict indicator (to the UE-B) regardless of whether to determine the resource conflict. For example, the above situation may be limited to a case where the resource conflict is almost for a resource. For example, when the UE-A succeeds in decoding the groupcast PSSCH transmitted by the UE-B, if the UE-A determines the resource conflict for the past resource, the UE-A may transmit NACK to the UE-B using a PSFCH resource corresponding to the PSSCH and/or transmit the resource conflict indicator to the UE-B. For example, when the UE-A succeeds in decoding the groupcast PSSCH transmitted by the UE-B, if the UE-A determines the resource conflict for a future reserved resource, the UE-A may transmit the resource conflict indicator.

For example, if the resource conflict occurs due to an overlap in time-frequency resources of different PSCCH/PSSCH resources, the UE-A may determine whether to transmit the resource conflict indicator depending on an overlap degree of the resources. For example, the number of RBs or the number of sub-channels overlapping between PSSCH resources of the UE-B-1 and the UE-B-2 estimated based on SCI received by the UE-A is equal to or greater than a (pre)set threshold, the UE-A may transmit the resource conflict indicator.

For example, the threshold may vary depending on an MCS value or range of PSSCH transmission corresponding to the resource conflict. For example, the threshold may vary depending on a data rate of PSSCH transmission corresponding to the resource conflict. For example, the threshold may vary depending on an RSRP measurement value or range at the UE-A end of PSSCH transmission corresponding to the resource conflict. For example, the threshold may vary depending on a difference value or range of RSRP measurement values at the UE-A end of PSSCH transmission corresponding to the resource conflict.

The variation in the threshold in an embodiment of the present disclosure may be that the threshold is (pre)set for each unit in an embodiment. For example, if a ratio of the number of allocated PSSCH RBs of the UE-B-1 or the UE-B-2 or the number of sub-channels compared to the number of RBs or the number of sub-channels overlapping between PSSCH resources of the UE-B-1 and the UE-B-2 estimated based on SCI received by the UE-A is equal to or greater than a (pre)set threshold, the UE-A may transmit the resource conflict indicator.

According to an embodiment of the present disclosure, the determination of the resource conflict for the further reserved resource may be determined based on SCI that the UE-A receives in the same slot. According to an embodiment of the present disclosure, the determination of the resource conflict for the further reserved resource may be determined based on SCI that the UE-A receives in different slots.

And/or, the UE-A may transmit the resource conflict indicator to each of all or some of the UEs corresponding to the resource conflict. Alternatively, the UE-A may transmit the resource conflict indicator to all or some of resources corresponding to the resource conflict, and a UE detecting the resource conflict indicator may compare a resource transmitted by the UE with a resource corresponding to the resource conflict indicator to determine whether reselect the resource.

For example, the UE-A may transmit the resource conflict indicator to each UE. For example, the UE-A may select a PSFCH resource based on information within SCI (e.g., second SCI) or information within SCI used when determining the resource conflict. For example, the information within SCI may be a start sub-channel of PSSCH and/or an assigned sub-channel and/or a transmission slot of SCI and/or a resource reservation period and/or L1-SOURCE ID. That is, the UE-A may select a PSFCH resource based on the L1-SOURCE ID included in the SCI.

For example, the UE-A may determine a PSFCH candidate resource set within a PSFCH RB set for additional information transmission based on the start sub-channel of PSSCH and/or the assigned sub-channel and/or transmission slot information of PSSCH in information within the SCI.

For example, the UE-A may select a PSFCH resource to be used for the transmission of the resource conflict indicator to all or some of the UEs-B corresponding to the resource conflict based on L1-SOURCE ID information in the information within the SCI in the PSFCH candidate resource set. For example, the UE-A may configure, based on the PSFCH resource, different STATE values (ACK or NACK) when the resource conflict occurs at a reception time of the SCI and when the resource conflict occurs at a further time derived as a resource reservation period value from the reception time of the SCI and may transmit the resource conflict indicator.

For example, the UE-A may transmit the resource conflict indicator to all the UEs corresponding to the resource conflict based on the PSFCH resources respectively corresponding to all the UEs.

For example, the UE-A may transmit the resource conflict indicator to a single UE or multiple UEs in highest order of the PSCCH and/or PSSCH DMRS based RSRP measurement value transmitted by the UE among the UEs corresponding to the resource conflict. For example, the UE-A may transmit the resource conflict indicator to a single UE or multiple UEs in lowest order of the PSCCH and/or PSSCH DMRS based RSRP measurement value transmitted by the UE among the UEs corresponding to the resource conflict.

For example, the number of UEs to receive the resource conflict indicator may be (pre-) set per resource pool and/or per congestion control level and/or per priority and/or per QoS parameter. For example, the number of UEs to receive the resource conflict indicator may be determined based on a specific ratio for the number of SCIs that the UE-A detects for the resource conflict. In this case, the specific ratio may be (pre-)set per resource pool and/or per congestion control level and/or per priority and/or per QoS parameter.

For example, the UE-A may transmit the resource conflict indicator to a UE, in which the PSCCH and/or PSSCH DMRS based RSRP measurement value transmitted by the UE is equal to or greater than a (pre)set threshold, among the UEs corresponding to the resource conflict. For example, the UE-A may transmit the resource conflict indicator to a UE, in which the PSCCH and/or PSSCH DMRS based RSRP measurement value transmitted by the UE is equal to or less than the (pre)set threshold, among the UEs corresponding to the resource conflict. For example, the threshold may be differently set per congestion control level and/or per priority and/or per QoS parameter.

For example, the UE-A may transmit the resource conflict indicator to a UE, in which the SL HARQ-ACK feedback is deactivated for the PSSCH transmitted by the UE, among the UEs corresponding to the resource conflict. A reason for this is that the efficiency of the resource conflict indicator may be reduced because when the transmitting UE receives the NACK in the case of the retransmission based on the SL HARQ-ACK feedback, the transmitting UE performs the retransmission for this. For example, the UE-A may transmit the resource conflict indicator to a UE which uses the SL HARQ-ACK feedback option 1 (NACK-ONLY) for the PSSCH transmitted by the UE among the UEs corresponding to the resource conflict. A reason for this is that although a transmitting UE is a UE activating the SL HARQ-ACK feedback, the transmitting UE may fail to distinguish ACK and SCI non-detection of the receiving UE.

For example, the UE-A may randomly select a specific ratio among the UEs corresponding to the resource conflict and transmit the resource conflict indicator to the selected UE. For example, the specific ratio may be differently set per congestion control level and/or per priority and/or per QoS parameter.

According to an embodiment of the present disclosure, transmission of all or some of the resource conflict indicators may be omitted based on the number of PSFCHs that the UE-A can simultaneously transmit. For example, the selection for the resource conflict indicator to be transmitted may be to succeed a priority value of PSSCH transmitted by the UE corresponding to the resource conflict and to determine a priority between transmission PSFCHs based on this.

For example, the UE-A may transmit the resource conflict indicator per conflict resource. For example, a PSFCH resource or a PSFCH candidate set for transmitting the resource conflict indicator may be distinguished per combination of SL slots and sub-channels corresponding to a transmission/reception time of PSFCH. For example, a PSFCH resource or a PSFCH candidate set for transmitting the resource conflict indicator may be distinguished per combination of a group of SL slots and a group of sub-channels corresponding to a transmission/reception time of PSFCH.

For example, the number of slots constituting the slot group and/or the number of sub-channels constituting the sub-channel group may be (pre-)configured. For example, the slot groups may not overlap each other. For example, the sub-channel groups may not overlap each other. For example, a PSFCH resource or a PSFCH candidate set for transmitting the resource conflict indicator may be distinguished per SL slot corresponding to a transmission/reception time of PSFCH. For example, a PSFCH resource or a PSFCH candidate set for transmitting the resource conflict indicator may be configured as one of all combinations of slots and sub-channels corresponding to a transmission/reception time of PSFCH.

This may be that when the UE-A determines the resource conflict based on SCI received within a window corresponding to the PSFCH transmission/reception time, the UE-A may transmit the resource conflict indicator for the window, and when the UE-B receiving the indicator performs PSSCH transmission within the window, the UE-B may determine that the resource conflict for the PSSCH transmission resource has occurred.

And/or, when the resource conflict indicator is constructed/configured per resource, an indication method for a future reserved resource may be ambiguous. This is that there may be a difference between UEs in a resource reservation period used for the resource reservation. For example, the PSFCH resource or PSFCH candidate set for the transmission of the resource conflict indicator and/or a PSFCH STATE value may be differently constructed/configured depending on all or some of resource reservation period values configured in a resource pool.

For example, the PSFCH resource may be selected based on an index of the resource reservation period value in the PSFCH candidate set. For example, the index of the resource reservation period value may have a value between 0 and 15 depending on 16 resource reservation periods configured in a resource pool. For example, the index of the resource reservation period value may be replaced by the reservation period value configured in the resource pool or a logical slot conversion value for this (the number of slots belonging to the resource pool). For example, the index of the resource reservation period value may be (pre-) configured together with a resource reservation period value that is a target of a resource conflict indication.

For example, the UE-A may transmit the resource conflict indicator using a PSFCH resource corresponding to a resource in which the resource conflict occurs. For example, the UE-A may transmit the resource conflict indicator using the PSFCH resource corresponding to again the resource reservation period in a PSFCH resource set corresponding to a resource derived by reverse-operating again the resource reservation period from time at which the resource conflict is expected. For example, when it is determined that the resource conflict occurs in a specific sub-channel in a further reserved resource, the UE-A may select a PSFCH resource candidate corresponding to the sub-channel in a slot that receives SCI acquiring the reserved resource information, and may select a PSFCH resource corresponding to the future reserved resource in the candidate.

For example, the UE-A may transmit the resource conflict indicator using PSFCH resources corresponding to all the resources corresponding to the resource conflict. In this case, the transmission of some indicator may be omitted depending on the number of simultaneous PSFCH transmissions of the UE-A.

For example, the UE-A may transmit the resource conflict indicator per consecutive resources corresponding to the resource conflict based on a sub-channel with a smallest index value within the consecutive resources by using PSFCH resource corresponding to this.

For example, the UE-A may transmit the resource conflict indicator preferentially to a small value of priority values indicated in the detected SCI corresponding to the resource conflict.

For example, the UE-A may transmit the resource conflict indicator preferentially to a high value of PSCCH and/or PSSCH DMRS based RSRP measurement values corresponding to the resource conflict. For example, the UE-A may transmit the resource conflict indicator preferentially to a small difference between the PSCCH and/or PSSCH DMRS based RSRP measurement values corresponding to the resource conflict. For example, the difference between RSRP measurement values may use a difference between the two highest values among RSRP measurement values for the same resource.

For example, when SL HARQ-ACK feedback for PSSCH corresponding to the resource conflict is deactivated, the UE-A may transmit the resource conflict indicator preferentially to this.

For example, when the SL HARQ-ACK feedback option 1 (NACK-ONLY) for PSSCH corresponding to the resource conflict is configured, the UE-A may transmit the resource conflict indicator preferentially to this.

For example, if a plurality of conflict resources has the same priority, the UE-A may preferentially transmit the resource conflict indicator for more resources with the priority. For example, a STATE value of PSFCH for the resource conflict indicator per conflict resource may be (pre)configured. For example, the STATE value of PSFCH for the resource conflict indicator per conflict resource may be differently used when the UE-A determines the resource conflict and when the UE-A does not determine the resource conflict. For example, the case in which the UE-A determines the resource conflict may be NACK (or ACK), and the case in which the UE-A does not determine the resource conflict may be ACK (or NACK). This is to determine, by the UE end detecting the resource conflict indicator, whether the actual resource conflict occurs based on information/statistics determined by multiple UEs-A.

According to an embodiment of the present disclosure, the unit (e.g., per UE or per resource) in which the UE-A transmits the resource conflict indicator may be (pre-)configured differently depending on the congestion control level. This is because when the number of UEs corresponding to the resource conflict increases, a method of transmitting the resource conflict indicator per UE may be inefficient in terms of signaling overhead.

Second Embodiment

This embodiment describes a method of omitting a resource reselection when receiving a resource conflict indicator.

Methods to be described below are merely distinguished for convenience of explanation. Thus, it is obvious that configuration of any method can be substituted or combined with configuration of another method.

When a UE-B receives a resource conflict indicator from a UE-A, the UE-B may not always reselect a resource corresponding to the indicator. For example, when the UE-B receives a resource conflict indicator for a resource it has transmitted in the past, if the UE-B receives ACK for the resource it has transmitted in the past, the UE-B may not perform retransmission for the same TB. For example, when the UE-B receives a resource conflict indicator for a future reserved resource, if the UE-B detects SCI indicating a resource overlapping the reserved resource as a value equal to or greater than a specific threshold and/or if a PSCCH and/or PSSCH DMRS based RSRP measurement value corresponding to the detected SCI is equal to or less than a (pre)set threshold, the UE-B may omit a resource reselection for a reserved resource corresponding to the resource conflict. For example, the specific threshold for the detected SCI may be (pre)set per resource pool, and/or per congestion control level (range), and/or per reception priority value, and/or per transmission priority value.

And/or, the future reserved resource may be divided into a reserved resource for initial transmission and a reserved resource for retransmission. In the case of retransmission resource, if ACK is determined for initial transmission, a transmitting UE may not use it. That is, if the resource conflict is indicated for a resource that has not been determined whether to use or not, the UE-B needs to determine whether to perform or omit the resource reselection for the resource.

For example, a resource that is a target of the resource reselection when the UE-B receives the resource conflict indicator from the UE-A may include an initial transmission resource of a next period reserved in initial transmission for the TB.

For example, the resource that is the target of the resource reselection when the UE-B receives the resource conflict indicator from the UE-A may include a transmission resource of a next period reserved from SCI transmitted by the UE-B.

For example, the resource that is the target of the resource reselection when the UE-B receives the resource conflict indicator from the UE-A may include a retransmission transmission resource derived based on time resource allocation field/information or TRIV field value from SCI transmitted by the UE-B. For example, performing reselection of the resource derived based on the time resource allocation field/information or the TRIV may also be limited to a case in which the UE-B determines NACK for the same TB. For example, performing reselection of the resource derived based on the time resource allocation field/information or the TRIV may be omitted when the UE-B transmits a (pre)set number or more of PSSCHs for the same TB in a groupcast HARQ-ACK feedback option 1, even if PSFCH for the TB is not received.

For example, the resource that is the target of the resource reselection when the UE-B receives the resource conflict indicator from the UE-A may include transmission resource of a next period reserved based on a resource reservation period value from a retransmission transmission resource derived based on the TRIV field value from SCI transmitted by the UE-B. For example, performing reselection of the resource derived based on the TRIV and the resource reservation period may be limited to a case where a new TB is efficient in a next reservation period at a UE-B end.

According to an embodiment of the present disclosure, condition of a UE that is a target of the resource reselection of the UE-B may be applied by extending to a condition in which the UE-A sends again the resource conflict indicator. For example, if the resource conflict is determined in a reserved resource of initial transmission that a UE-A end determines based on whether or not there is NDI toggle, the UE-A end may send the resource conflict indicator, and may omit transmission of the resource conflict indicator if the resource conflict is determined for a retransmission resource of a next reservation period.

Third Embodiment

This embodiment describes a method of performing a resource reselection when receiving a resource conflict indicator.

Methods to be described below are merely distinguished for convenience of explanation. Thus, it is obvious that configuration of any method can be substituted or combined with configuration of another method.

When a UE-B receives a resource conflict indicator from a UE-A, there is a need to determine a resource that is a target of reselection for a resource corresponding to the indicator. For example, the UE-B may reselect resources so that all of frequency and time resources corresponding to the resource conflict indicator do not overlap. For example, the UE-B may reselect resources at slots other than a slot location of resources corresponding to the resource conflict indicator. For example, the UE-B may reselect resources so that some of frequency and time resources corresponding to the resource conflict indicator do not overlap. For example, the some resources may reselect resources so that a specific number of RBs or a specific number of sub-channels are excluded from sub-channels on which the UE-B transmits SCI.

For example, the specific number of RBs and/or the specific number of sub-channels may be (pre)set. For example, the specific number of RBs and/or the specific number of sub-channels may be obtained from the resource conflict indicator. For example, PSFCH resource and/or PSFCH state for the resource conflict indicator may vary depending on the specific number of RBs and/or the specific number of sub-channels. For example, the some resources may reselect resources so that a specific RB group or a specific sub-channel group is excluded from PSSCH resources of the UE-B. For example, a location of the specific RB group and/or the specific sub-channel group may be obtained from the resource conflict indicator. For example, the PSFCH resource and/or PSFCH state for the resource conflict indicator may vary depending on the specific RB group and/or the specific sub-channel group based on a PSSCH start sub-channel of the UE-B.

Fourth Embodiment

This embodiment describes a method of performing a decoding with only received data acquired based on retransmission.

Methods to be described below are merely distinguished for convenience of explanation. Thus, it is obvious that configuration of any method can be substituted or combined with configuration of another method.

A UE-B may receive, from a UE-A, a resource conflict indicator for resources that the UE-B has transmitted in the past. And/or, the UE-B may recognize a situation where the resources used for transmission in the past by the resource conflict indicator overlap another PSSCH transmission at time and/or frequency sides. And/or, in the situation, a receiving UE of PSCCH/PSSCH transmitted by the UE-B may expect a retransmission and may store, in a buffer, previously received PSSCH for the same TB or information such as corresponding coded bits or received data value. In a normal situation, when a UE receives retransmission for the same TB, the UE combines the coded bits or the received data value, that have been already stored in the buffer, and a received data value acquired in the retransmission and attempts decoding for the combined data value. However, as in the above situation, the received data that has been previously acquired and stored is in a corrupted state due to the resource conflict, etc., and the corrupted data value may not be restored even if the received data receives multiple retransmissions. In this case, it may be an advantage in terms of performance to empty the corrupted data value stored in the buffer (i.e., buffer flush) and attempt the decoding with only received data acquired upon the retransmission.

For example, when the UE-B receives, from the UE-A, the resource conflict indicator for resources that the UE-B has already transmitted, the UE-B may provide information that indicates or recommends the buffer flush to the receiving UE when performing retransmission for the same TB. For example, although the UE-B transmits retransmission for the same TB, the UE-B may toggle NDI value of SCI. In this case, the receiving UE may assume information for retransmission as a new TB to empty the buffer, and then attempt decoding with only a newly received data value.

For example, when the UE-B performs the retransmission for the same TB, the UE-B may indicate the receiving UE to empty the data value that has been previously received upon the decoding for the same TB using a specific value of a RESERVED field of (first) SCI. In this case, the receiving UE may attempt decoding with only received data acquired from the retransmission. For example, when the UE-B performs the retransmission for the same TB, the UE-B may indicate the receiving UE to combine a newly acquired data value in retransmission with the previously received data value that has been stored in the buffer upon the decoding for the same TB using the specific value of the RESERVED field of the (first) SCI and to perform the decoding.

And/or, the UE-A sending the resource conflict indicator may be a receiving UE of the UE-B. In this case, for example, when the UE-A transmits a resource conflict (e.g., overlap of a plurality of PSSCH resources) indicator for resources that the UE-B has transmitted in the past, when the UE-A receives again a retransmission PSSCH for the same TB from the UE-B, the UE-A may empty a received data value for the TB from the buffer and perform decoding for the TB with only a data value acquired from the retransmission.

Figure 11:
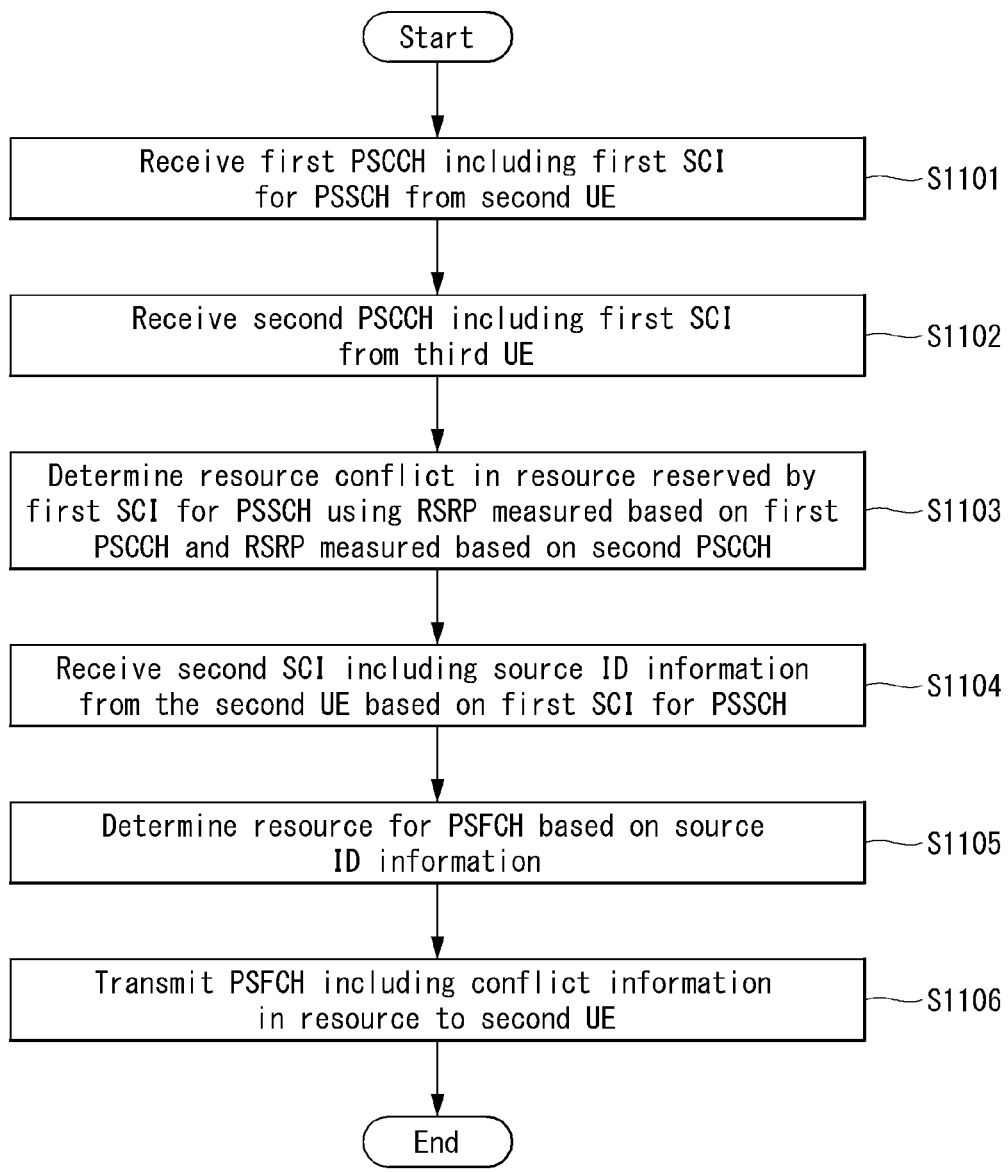
FIG. 11 is a flow chart illustrating an operation method of a first UE described in the present disclosure.

FIG. 11 is a flow chart illustrating an operation method of a first UE described in the present disclosure.

Referring to FIG. 11, first, a first UE (100/200 of FIGS. 13 to 18) may receive, from a second UE, a first physical sidelink control channel (PSCCH) including first sidelink control information (SCI), in step S1101. Hereinafter, first SCI of the second UE may be referred to as first SCI for the PSSCH so that it is distinguished from first SCI of a third UE. And/or, the second UE may be applied by being replaced/substituted with one or more UEs.

And/or, in the present disclosure, a 'UE' may be called a 'device'. For example, the 'first UE' may be called a first 'device', the 'second UE' may be called a second 'device', and the 'third UE' may be called a third 'device'.

And/or, an operation method of FIG. 11 may be an operation in a mode of (b) of FIG. 6. And/or, the operation method of FIG. 11 may refer to the contents described with reference to (b) of FIG. 6.

And/or, before step S1101, the first UE may transmit assistance information to the second UE and/or the third UE. For example, a detailed description of the assistance information may refer to the contents described with reference to FIG. 10.

For example, an operation of the first UE in step S1101 to receive the first PSCCH may be implemented by the device of FIGS. 13 to 18. For example, referring to FIG. 14, one or more processors 102/202 may control one or more memories 104/204 and/or one or more transceivers 106/206 so as to receive the first PSCCH.

And/or, the first UE (100/200 of FIGS. 13 to 18) may receive a second PSCCH including the second SCI from the third UE, in step S1102. And/or, the third UE may be applied by being replaced/substituted with one or more UEs.

For example, the first SCI (for PSSCH) of the second UE and/or the second SCI of the third UE may be first stage SCI used for scheduling a PSSCH of 2-stage SCI and/or second stage SCI.

And/or, a resource reserved by the second SCI may overlap a resource reserved by the first SCI for PSSCH. For example, the first SCI for PSSCH and/or the second SCI may include frequency resource assignment information/time resource assignment information/resource reservation period information for resource reservation, and the like.

And/or, a more detailed description of the first SCI for PSSCH and/or the second SCI may refer to the contents of the first SCI described in the present disclosure.

And/or, the resource reserved by the second SCI may overlap the resource reserved by the first SCI for PSSCH in a time domain and/or a frequency domain.

For example, an operation of the first UE in step S1102 to receive the second PSCCH may be implemented by the device of FIGS. 13 to 18. For example, referring to FIG. 14, one or more processors 102/202 may control one or more memories 104/204 and/or one or more transceivers 106/206 so as to receive the second PSCCH.

And/or, the first UE (100/200 of FIGS. 13 to 18) may determine, based on a resource reserved by the first SCI overlapping a resource reserved by the second SCI, a resource conflict in the resource reserved by the first SCI for PSSCH using a reference signal received power (RSRP) measured based on the first PSCCH and a RSRP measured based on the second PSCCH, in step S1103.

And/or, the resource conflict may be determined by comparing a difference value between the RSRP measured based on the first PSCCH and the RSRP measured based on the second PSCCH with a preset threshold. For example, the threshold may be separately signaled/set. And/or, the threshold may be signaled by a base station.

And/or, the RSRP measured based on the first PSCCH may be measured based on a demodulation reference signal (DMRS) for the first PSCCH, and the RSRP measured based on the second PSCCH may be measured based on a DMRS for the second PSCCH.

For example, the first UE may determine a resource conflict for the second UE based on a resource reserved by the first SCI for PSSCH of the second UE overlapping a resource reserved by the second SCI of the third UE, and a value obtained by subtracting a DMRS RSRP of the first PSCCH of the second UE from a DMRS RSRP of the second PSCCH of the third UE being greater than a threshold. And/or, the first UE may be a destination UE of the second UE or an intended receiver for PSSCH of the second UE.

And/or, the RSRP may be measured based on a PSSCH DMRS.

For example, an operation of the first UE in step S1103 to determine the resource conflict may be implemented by the device of FIGS. 13 to 18. For example, referring to FIG. 14, one or more processors 102/202 may control one or more memories 104/204 and/or one or more transceivers 106/206 so as to determine the resource conflict.

And/or, the first UE (100/200 of FIGS. 13 to 18) may receive, from the second UE, third SCI including source identifier (ID) information based on the first SCI for PSSCH, in step S1104. For example, the third SCI may be second stage SCI scheduled by first stage SCI (e.g., first SCI) of 2-stage SCI. And/or, the third SCI may be included in the PSSCH.

For example, an operation of the first UE in step S1104 to receive the third SCI may be implemented by the device of FIGS. 13 to 18. For example, referring to FIG. 14, one or more processors 102/202 may control one or more memories 104/204 and/or one or more transceivers 106/206 so as to receive the third SCI.

And/or, the first UE (100/200 of FIGS. 13 to 18) may determine a resource for a physical sidelink feedback channel (PSFCH) based on the source ID information, in step S1105.

For example, an operation of the first UE in step S1105 to determine the resource for the PSFCH may be implemented by the device of FIGS. 13 to 18. For example, referring to FIG. 14, one or more processors 102/202 may control one or more memories 104/204 and/or one or more transceivers 106/206 so as to determine the resource for the PSFCH.

And/or, the first UE (100/200 of FIGS. 13 to 18) may transmit, to the second UE, a PSFCH including conflict information in the resource, in step S1106. And/or, the conflict information may be information representing the resource conflict. For example, the conflict information may be information informing a conflict of all or some of reserved resources.

And/or, based on the conflict information, a resource capable of being determined by the second UE may include a resource based on time resource assignment information (e.g., TRIV) included in the first SCI for PSSCH. And/or, the resource capable of being determined by the second UE may include a resource that is determined by interpreting time resource assignment information included in the first SCI for PSSCH in another method.

And/or, based on the conflict information, the resource capable of being determined by the second UE may be included in a slot different from a slot of a resource corresponding to the conflict information.

And/or, based on the conflict information, the resource capable of being determined by the second UE may include an initial transmission resource of a next period and/or a resource reserved in a next period. And/or, based on the conflict information, the resource capable of being determined by the second UE may include a resource reserved in a next period by the first SCI. For example, the period may be configured/indicated based on resource reservation period information/field of the first SCI. And/or, the next period may mean a period following a period including a conflicted resource.

The resource capable of being determined by the second UE based on the conflict information may mean a resource that the second UE can reselects/re-determine to transmit the PS SCH based on the conflict information.

And/or, in the operation method of FIG. 11, 'transmission and reception of PSCCH including SCI' and 'transmission and reception of PSFCH including conflict information' may mean 'transmission and reception of SCI on PSCCH' and 'transmission and reception of conflict information on PSFCH'.

For example, an operation of the first UE in step S1106 to transmit the PSFCH may be implemented by the device of FIGS. 13 to 18. For example, referring to FIG. 14, one or more processors 102/202 may control one or more memories 104/204 and/or one or more transceivers 106/206 so as to transmit the PSFCH.

The operation method of FIG. 11 may refer to the description of the first to fourth embodiments for a more detailed description. And/or, the operation method of FIG. 11 is merely an example, and thus all or part of the operation method of FIG. 11 may be replaced/substituted with all or part of the proposal methods of the first to fourth embodiments. And/or, all or part of the proposal methods of the first to fourth embodiments may be added to the operation method of FIG. 11.

Since the operation of the first UE described with reference to FIG. 11 is the same as the operation of the first UE described with reference to FIGS. 1 to 10 (e.g., the first to fourth embodiments), a detailed operation thereof is omitted.

The signaling and the operation described above may be implemented by a device (e.g., FIGS. 13 to 18) to be described below. For example, the signaling and the operation described above may be processed by one or more processors of FIGS. 13 to 18, and the signaling and the operation described above may be stored in the form of commands/programs (e.g., instructions, executable codes) for running one or more processors of FIGS. 13 to 18.

For example, a processing apparatus configured to control a first UE to transmit a PSFCH in a wireless communication system comprises at least one processor and at least one memory operatively connected to the at least one processor and configured to store instructions performing operations based on the instructions being executed by the at least one processor, and the operations may comprise receiving a first PSCCH including first SCI from a second UE, receiving a second PSCCH including the second SCI from a third UE, determining, based on a resource reserved by the first SCI overlapping a resource reserved by the second SCI, a resource conflict in the resource reserved by the first SCI using a RSRP measured based on the first PSCCH and a RSRP measured based on the second PSCCH, receiving, from the second UE, third SCI including source ID information based on the first SCI, determining a resource for the PSFCH based on the source ID information, and transmitting, to the second UE, the PSFCH including conflict information indicating the resource conflict in the resource.

For example, in a computer readable storage medium storing at least one instruction, that allows at least one processor to control operations, based on the at least one instruction being executed by the at least one processor, the operations may comprise receiving a first PSCCH including first SCI from a first UE, receiving a second PSCCH including the second SCI from a second UE, determining, based on a resource reserved by the first SCI overlapping a resource reserved by the second SCI, a resource conflict in the resource reserved by the first SCI using a RSRP measured based on the first PSCCH and a RSRP measured based on the second PSCCH, receiving, from the first UE, third SCI including source ID information based on the first SCI, determining a resource for a PSFCH based on the source ID information, and transmitting, to the first UE, the PSFCH including conflict information indicating the resource conflict in the resource.

Figure 12:
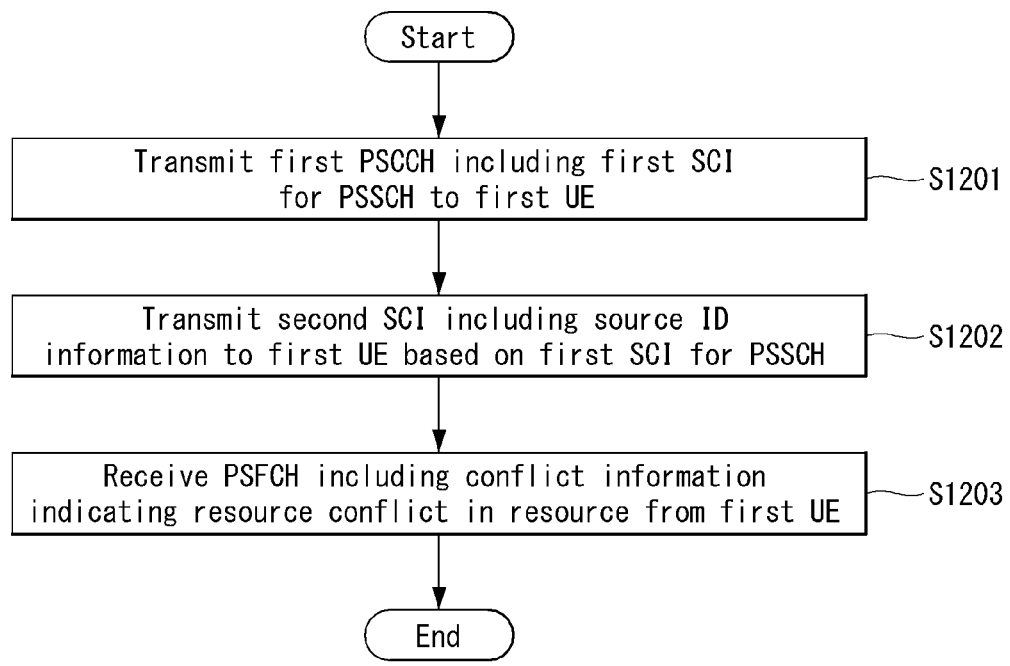
FIG. 12 is a flow chart illustrating an operation method of a second UE described in the present disclosure.

FIG. 12 is a flow chart illustrating an operation method of a second UE described in the present disclosure.

Referring to FIG. 12, first, a second UE (100/200 of FIGS. 13 to 18) may transmit, to a first UE, a first physical sidelink control channel (PSCCH) including first sidelink control information (SCI), in step S1201.

And/or, in the present disclosure, a 'UE' may be called a 'device'. For example, the 'first UE' may be called a first 'device', the 'second UE' may be called a second 'device', and the 'third UE' may be called a third 'device'.

And/or, an operation method of FIG. 12 may be an operation in a mode of (b) of FIG. 6. And/or, the operation method of FIG. 12 may refer to the contents described with reference to (b) of FIG. 6.

Hereinafter, first SCI of the second UE may be referred to as first SCI for the PSSCH so that it is distinguished from first SCI of a third UE. And/or, the second UE may be applied by being replaced/substituted with one or more UEs.

And/or, a resource reserved by the first SCI may overlap a resource reserved by a second SCI included in a second PSCCH of the third UE. And/or, the third UE may be applied by being replaced/substituted with one or more UEs.

For example, the resource reserved by the second SCI and the resource reserved by the first SCI may overlap each other in a time domain and/or a frequency domain.

For example, the first SCI (for PSSCH) of the second UE and/or the second SCI of the third UE may be first stage SCI used for scheduling a PSSCH of 2-stage SCI and/or second stage SCI.

For example, the first SCI for PSSCH and/or the second SCI may include frequency resource assignment information/time resource assignment information/resource reservation period information for resource reservation, and the like.

And/or, a more detailed description of the first SCI for PSSCH and/or the second SCI may refer to the contents of the first SCI described in the present disclosure.

And/or, a resource conflict in a resource reserved by the first SCI for PSSCH may be determined, based on the resource reserved by the first SCI overlapping a resource reserved by the second SCI included in a second PSCCH of a third UE, using a reference signal received power (RSRP) measured based on the first PSCCH and a RSRP measured based on the second PSCCH.

And/or, the resource conflict may be determined by comparing a difference value between the RSRP measured based on the first PSCCH and the RSRP measured based on the second PSCCH with a preset threshold. For example, the threshold may be separately signaled/set. And/or, the threshold may be signaled by a base station.

And/or, the RSRP measured based on the first PSCCH may be measured based on a demodulation reference signal (DMRS) for the first PSCCH, and the RSRP measured based on the second PSCCH may be measured based on a DMRS for the second PSCCH.

For example, the first UE may determine a resource conflict for the second UE based on a resource reserved by the first SCI for PSSCH of the second UE overlapping a resource reserved by the second SCI of the third UE, and a value obtained by subtracting a DMRS RSRP of the first PSCCH of the second UE from a DMRS RSRP of the second PSCCH of the third UE being greater than a threshold. And/or, the first UE may be a destination UE of the second UE or an intended receiver for PSSCH of the second UE.

And/or, the RSRP may be measured based on PSSCH DMRS.

And/or, before step S1201, the second UE may receive assistance information from the first UE. For example, a more detailed description of the assistance information may refer to the contents described with reference to FIG. 10.

For example, an operation of the second UE in step S1201 to transmit the first PSCCH may be implemented by the device of FIGS. 13 to 18. For example, referring to FIG. 14, one or more processors 102/202 may control one or more memories 104/204 and/or one or more transceivers 106/206 so as to transmit the first PSCCH.

And/or, the second UE (100/200 of FIGS. 13 to 18) may transmit, to the first UE, third SCI including source identifier (ID) information based on the first SCI for PSSCH, in step S1202. And/or, a resource for a physical sidelink feedback channel (PSFCH) may be determined based on the source ID information.

For example, the third SCI may be second stage SCI scheduled by first stage SCI (e.g., first SCI) of 2-stage SCI. And/or, the third SCI may be included in the PSSCH.

For example, an operation of the second UE in step S1202 to transmit the third SCI may be implemented by the device of FIGS. 13 to 18. For example, referring to FIG. 14, one or more processors 102/202 may control one or more memories 104/204 and/or one or more transceivers 106/206 so as to transmit the third SCI.

And/or, the second UE (100/200 of FIGS. 13 to 18) may receive, from the first UE, a PSFCH including conflict information in the resource, in step S1203. And/or, the conflict information may be information indicating the resource conflict. For example, the conflict information may be information informing a conflict of all or some of reserved resources.

And/or, based on the conflict information, a resource capable of being determined by the second UE may include a resource based on time resource assignment information (e.g., TRIV) included in the first SCI for PSSCH.

And/or, based on the conflict information, a resource capable of being determined by the second UE may include a resource based on time resource assignment information (e.g., TRIV) included in the first SCI for PSSCH.

And/or, the resource capable of being determined by the second UE may include a resource that is determined by interpreting time resource assignment information included in the first SCI for PSSCH in another method.

And/or, based on the conflict information, the resource capable of being determined by the second UE may be included in a slot different from a slot of a resource corresponding to the conflict information.

And/or, based on the conflict information, the resource capable of being determined by the second UE may include an initial transmission resource of a next period and/or a resource reserved in a next period. And/or, based on the conflict information, the resource capable of being determined by the second UE may include a resource reserved in a next period by the first SCI. For example, the period may be configured/indicated based on resource reservation period information/field of the first SCI. And/or, the next period may mean a period following a period including a conflicted resource.

The resource capable of being determined by the second UE based on the conflict information may mean a resource that the second UE can reselects/redetermine to transmit the PSSCH based on the conflict information.

And/or, in the operation method of FIG. 12, 'transmission and reception of PSCCH including SCI' and 'transmission and reception of PSFCH including conflict information' may mean 'transmission and reception of SCI on PSCCH' and 'transmission and reception of conflict information on PSFCH'.

For example, an operation of the second UE in step S1203 to receive the PSFCH may be implemented by the device of FIGS. 13 to 18. For example, referring to FIG. 14, one or more processors 102/202 may control one or more memories 104/204 and/or one or more transceivers 106/206 so as to receive the PSFCH.

The operation method of FIG. 12 may refer to the description of the first to fourth embodiments for a more detailed description. And/or, the operation method of FIG. 12 is merely an example, and thus all or part of the operation method of FIG. 12 may be replaced/substituted with all or part of the proposal methods of the first to fourth embodiments. And/or, all or part of the proposal methods of the first to fourth embodiments may be added to the operation method of FIG. 12.

Since the operation of the second UE described with reference to FIG. 12 is the same as the operation of the second UE described with reference to FIGS. 1 to 11 (e.g., the first to fourth embodiments), a detailed operation thereof is omitted.

The signaling and the operation described above may be implemented by a device (e.g., FIGS. 13 to 18) to be described below. For example, the signaling and the operation described above may be processed by one or more processors of FIGS. 13 to 18, and the signaling and the operation described above may be stored in the form of commands/programs (e.g., instructions, executable codes) for running one or more processors of FIGS. 13 to 18.

For example, a processing apparatus configured to control a second UE to receive a PSFCH in a wireless communication system comprises at least one processor and at least one memory operatively connected to the at least one processor and configured to store instructions performing operations based on the instructions being executed by the at least one processor, and the operations may comprise transmitting, to a first UE, a first PSCCH including first SCI, wherein a resource conflict in a resource reserved by the first SCI is determined, based on the resource reserved by the first SCI overlapping a resource reserved by the second SCI included in a second PSCCH of a third UE, based on a RSRP measured based on the first PSCCH and a RSRP measured based on the second PSCCH, transmitting, to the first UE, third SCI including source ID information based on the first SCI, wherein a resource for the PSFCH is determined based on the source ID information, and receiving, from the first UE, the PSFCH including conflict information indicating the resource conflict in the resource.

For example, in a computer readable storage medium storing at least one instruction, that allows at least one processor to control operations, based on the at least one instruction being executed by the at least one processor, the operations may comprise transmitting, to a first UE, a first PSCCH including first SCI, wherein a resource conflict in a resource reserved by the first SCI is determined, based on the resource reserved by the first SCI overlapping a resource reserved by the second SCI included in a second PSCCH of a second UE, based on a RSRP measured based on the first PSCCH and a RSRP measured based on the second PSCCH, transmitting, to the first UE, third SCI including source ID information based on the first SCI, wherein a resource for the PSFCH is determined based on the source ID information, and receiving, from the first UE, the PSFCH including conflict information indicating the resource conflict in the resource.

Various embodiments of the present disclosure can be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
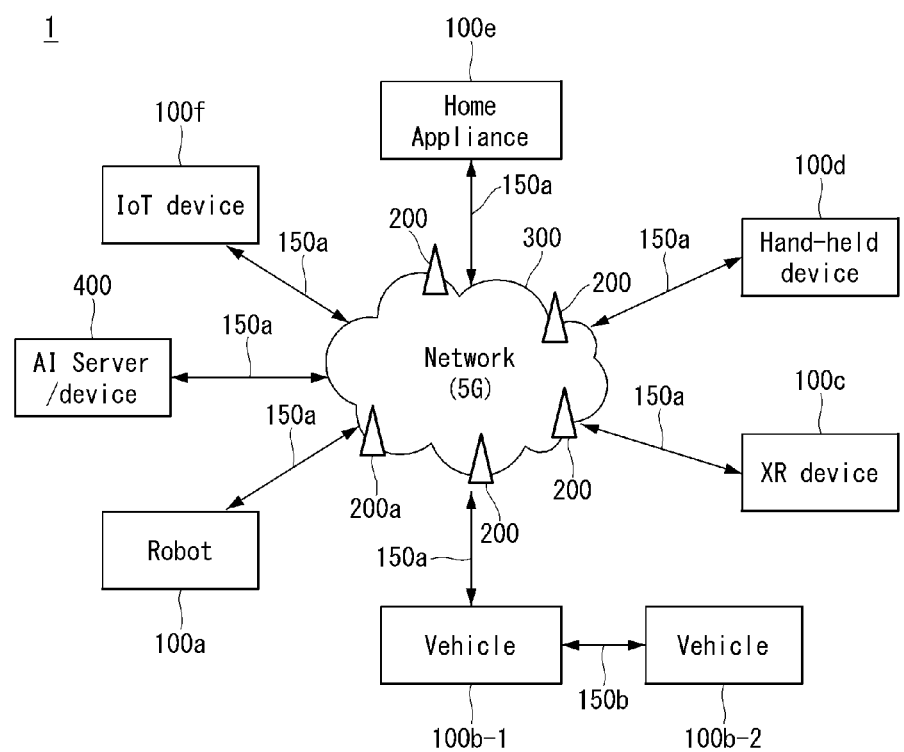
FIG. 13 illustrates a communication system (1) according to an embodiment of the present disclosure.

FIG. 13 illustrates a communication system 1 based on an embodiment of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
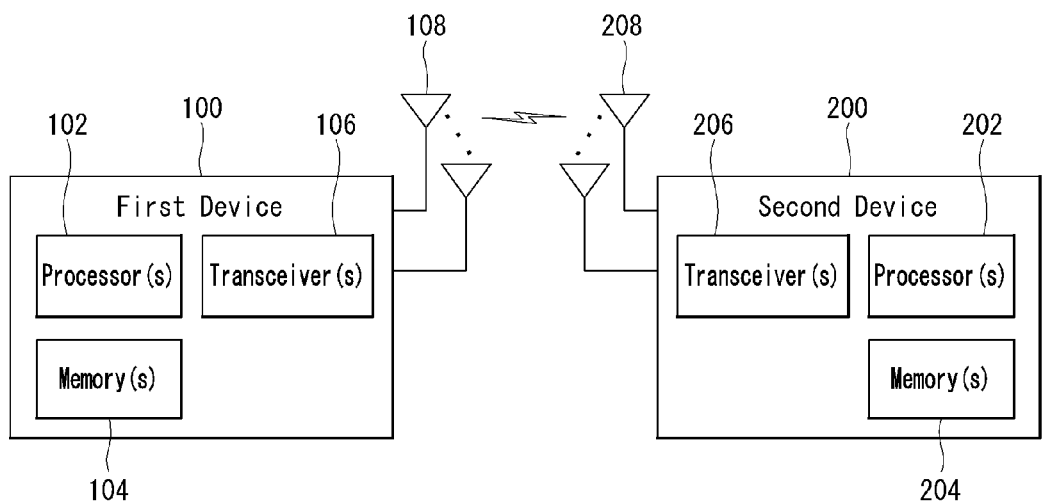
FIG. 14 illustrates a wireless device according to an embodiment of the present disclosure.

FIG. 14 illustrates wireless devices based on an embodiment of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
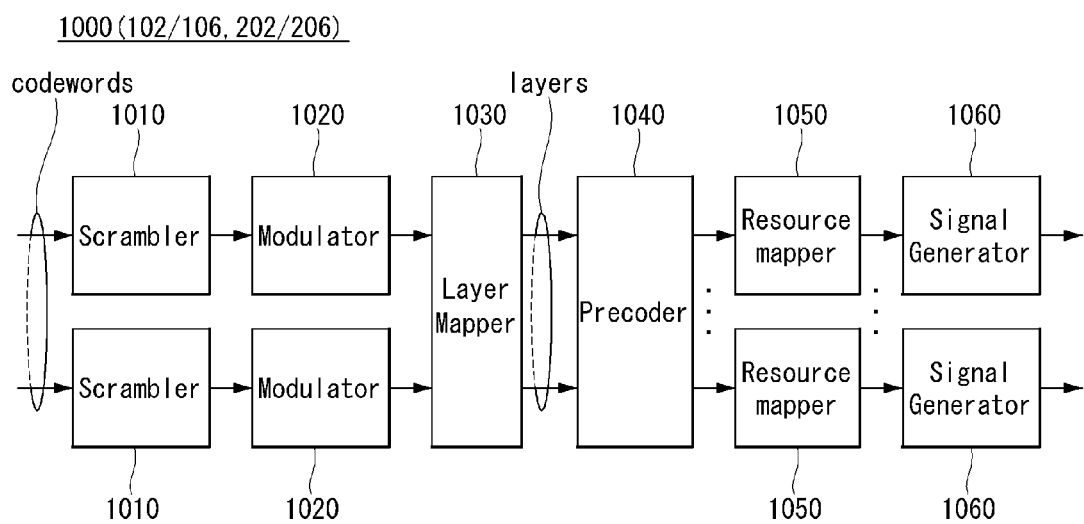
FIG. 15 illustrates a signal processing circuit for a transmission signal according to an embodiment of the present disclosure.

FIG. 15 illustrates a signal processing circuit for a transmission signal based on an embodiment of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. X2. For example, the wireless devices (e.g., 100 and 200 of FIG. X1) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 16:
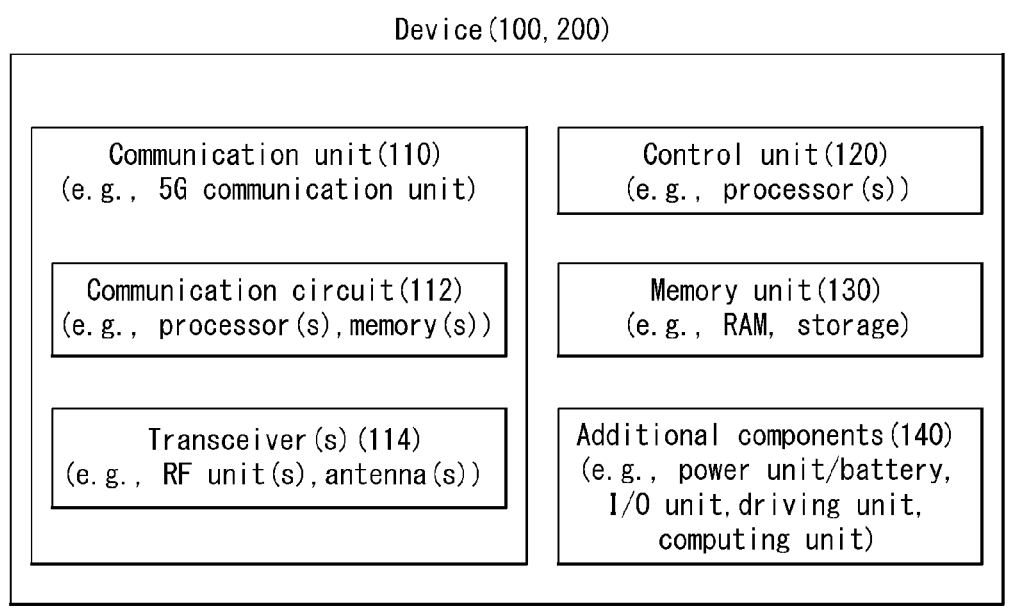
FIG. 16 illustrates a wireless device according to an embodiment of the present disclosure.

FIG. 16 illustrates another example of a wireless device based on an embodiment of the present disclosure. The wireless device may be implemented in various forms based on a use-case/service (refer to FIG. 13).

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place based on a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

Figure 17:
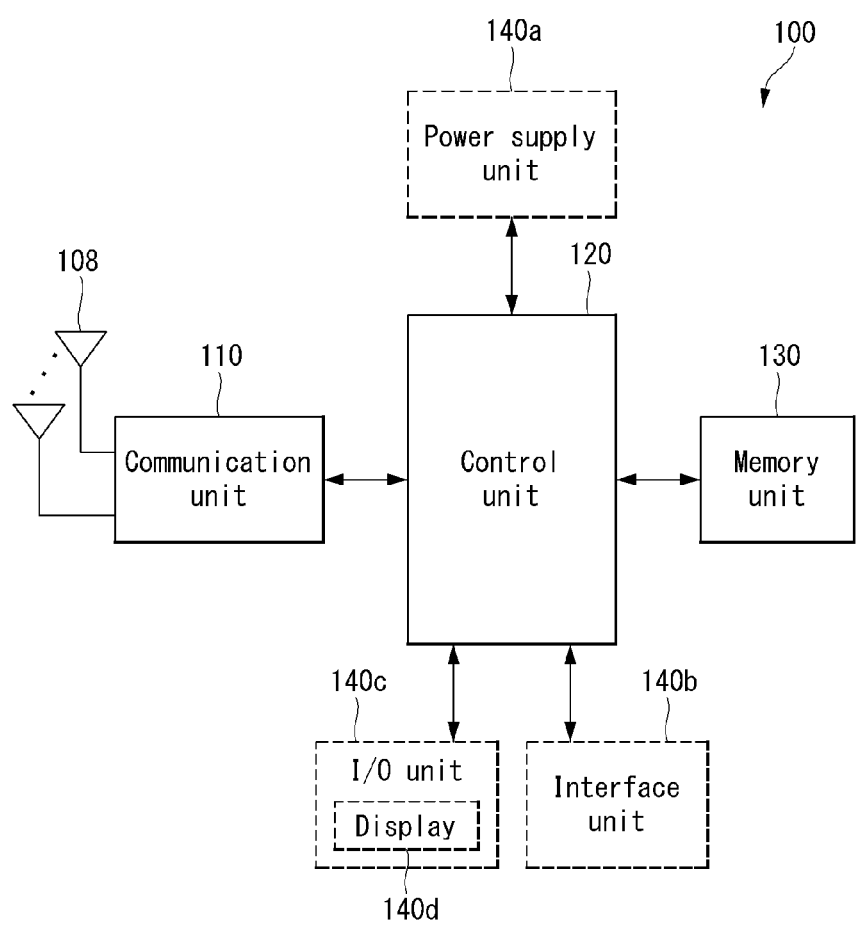
FIG. 17 illustrates a mobile device according to an embodiment of the present disclosure.

FIG. 17 illustrates a mobile device based on an embodiment of the present disclosure. The hand-held device may include a smartphone, a smartpad, a wearable device (e.g., a smartwatch or a smartglasses), or a portable computer (e.g., a notebook). The mobile device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 17, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 18:
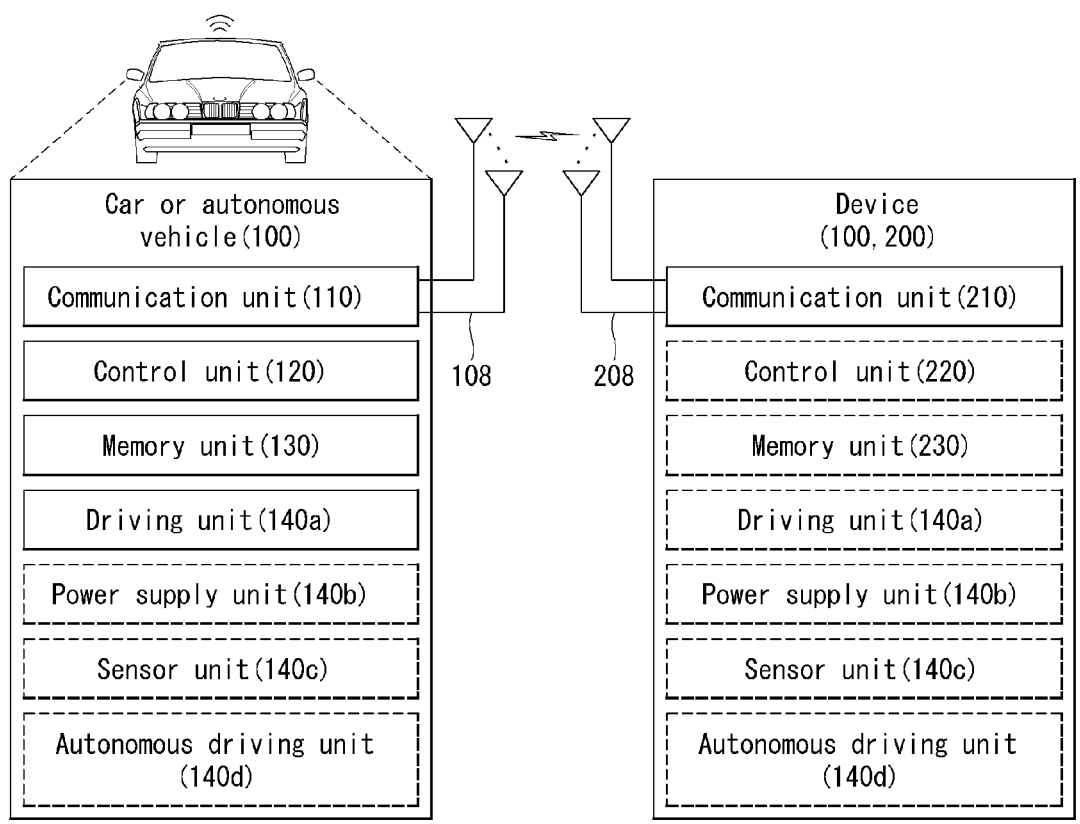
FIG. 18 illustrates a vehicle or an autonomous vehicle according to an embodiment of the present disclosure.

FIG. 18 illustrates a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 18, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

In this case, a wireless communication technology implemented in the wireless device 200, 200 of the present disclosure may include Narrowband Internet of Things for low energy communication in addition to LTE, NR and 6G. In this case, for example, the NB-IoT technology may be an example of a Low Power Wide Area Network (LPWAN) technology, and may be implemented by standards, such as LTE Cat NB1 and/or LTE Cat NB2, and the present disclosure is not limited to the aforementioned names. Additionally or alternatively, a wireless communication technology implemented in a wireless device (100, 200) of the present disclosure may perform communication based on the LTE-M technology. In this case, for example, the LTE-M technology may be an example of the LPWAN technology and may be called various names, such as enhanced Machine Type Communication (eMTC). For example, the LTE-M technology may be implemented by at least any one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and the present disclosure is not limited to the aforementioned names. Additionally or alternatively, a wireless communication technology implemented in a wireless device (100, 200) of the present disclosure may include at least any one of ZigBee, Bluetooth and a Low Power Wide Area Network (LPWAN) in which low energy communication is considered, and the present disclosure is not limited to the aforementioned names. For example, the ZigBee technology may generate a personal area networks (PAN) related to small/low-power digital communication based on various standards, such as IEEE 802.15.4, and may be called various names.

Claims disclosed in the present disclosure may be combined in various ways. For example, technical features of method claims of the present disclosure may be combined and implemented as a device, and technical features of device claims of the present disclosure may be combined and implemented as a method. Further, the technical features of method claims and the technical features of device claims in the present disclosure may be combined and implemented as a device, and the technical features of method claims and the technical features of device claims in the present disclosure may be combined and implemented as a method.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

The method of transmitting and receiving PSCCH/PSSCH/PSFCH in a wireless communication system according to the present disclosure has been described focusing on examples applying to 3GPP LTE/LTE-A system, 5G system (New RAT system), etc., but the method can be applied to various wireless communication systems including beyond 5G, 6G, beyond 6G, etc.

What is claimed is:

1. A method of transmitting, by a first user equipment (UE), a physical sidelink feedback channel (PSFCH) in a wireless communication system, the method comprising:
   receiving, from a second UE, a first physical sidelink control channel (PSCCH) including first sidelink control information (SCI);
   receiving, from a third UE, a second PSCCH including second SCI;
   determining, based on a first resource reserved by the first SCI overlapping a second resource reserved by the second SCI, a resource conflict in the first resource reserved by the first SCI using a difference value between a first reference signal received power (RSRP) measured based on the first PSCCH and a second RSRP measured based on the second PSCCH;
   receiving, from the second UE, third SCI including source identifier (ID) information through a physical sidelink shared channel (PSSCH) scheduled by the first SCI;
   determining a third resource for the PSFCH based on the source ID information; and
   transmitting, through the third resource, the PSFCH including conflict information indicating the resource conflict in the first resource.

2. The method of claim 1, wherein the resource conflict is determined by comparing the difference value between the first RSRP measured based on the first PSCCH and the second RSRP measured based on the second PSCCH with a preset threshold.

3. The method of claim 2, wherein the first RSRP measured based on the first PSCCH is measured based on a first demodulation reference signal (DMRS) for the first PSCCH, and the second RSRP measured based on the second PSCCH is measured based on a second DMRS for the second PSCCH.

4. The method of claim 1, wherein based on the conflict information, a resource capable of being determined by the second UE includes a resource based on time resource assignment information included in the first SCI.

5. The method of claim 1, wherein based on the conflict information, a resource capable of being determined by the second UE is included in a slot different from a slot of a resource corresponding to the conflict information.

6. A first user equipment (UE) configured to transmit a physical sidelink feedback channel (PSFCH) in a wireless communication system, the first UE comprising:
   at least one transceiver;
   at least one processor; and
   at least one memory operably connectable to the at least one processor and storing instructions that, based on being executed by the at least one processor, perform operations comprising:
   receiving, from a second UE, a first physical sidelink control channel (PSCCH) including first sidelink control information (SCI);
   receiving, from a third UE, a second PSCCH including second SCI;
   determining, based on a first resource reserved by the first SCI overlapping a second resource reserved by the second SCI, a resource conflict in the first resource reserved by the first SCI using a difference value between a first reference signal received power (RSRP) measured based on the first PSCCH and a second RSRP measured based on the second PSCCH;
   receiving, from the second UE, third SCI including source identifier (ID) information through a physical sidelink shared channel (PSSCH) scheduled by the first SCI;
   determining a third resource for the PSFCH based on the source ID information; and
   transmitting, through the third resource, the PSFCH including conflict information indicating the resource conflict in the first resource.

7. The first UE of claim 6, wherein the resource conflict is determined by comparing the difference value between the first RSRP measured based on the first PSCCH and the second RSRP measured based on the second PSCCH with a preset threshold.

8. The first UE of claim 7, wherein the first RSRP measured based on the first PSCCH is measured based on a first demodulation reference signal (DMRS) for the first PSCCH, and the second RSRP measured based on the second PSCCH is measured based on a second DMRS for the second PSCCH.

9. A method of receiving, by a second user equipment (UE), a physical sidelink feedback channel (PSFCH) in a wireless communication system, the method comprising:
   transmitting, to a first UE, a first physical sidelink control channel (PSCCH) including first sidelink control information (SCI),
   wherein a resource conflict in a first resource reserved by the first SCI is determined, based on the first resource reserved by the first SCI overlapping a second resource reserved by the second SCI included in a second PSCCH of a third UE, using a difference value between a first reference signal received power (RSRP) measured based on the first PSCCH and a second RSRP measured based on the second PSCCH;
   transmitting, to the first UE, third SCI including source identifier (ID) information through a physical sidelink shared channel (PSSCH) scheduled by the first SCI,
   wherein a third resource for the PSFCH is determined based on the source ID information; and
   receiving, through the third resource, the PSFCH including conflict information indicating the resource conflict in the first resource.

10. The method of claim 9, wherein the resource conflict is determined by comparing the difference value between the first RSRP measured based on the first PSCCH and the second RSRP measured based on the second PSCCH with a preset threshold.

11. The method of claim 10, wherein the first RSRP measured based on the first PSCCH is measured based on a first demodulation reference signal (DMRS), and the second RSRP measured based on the second PSCCH is measured based on a second DMRS for the second PSCCH.

12. The method of claim 9, wherein based on the conflict information, a resource capable of being determined by the second UE includes a resource based on time resource assignment information included in the first SCI.

13. The method of claim 9, wherein based on the conflict information, a resource capable of being determined by the second UE is included in a slot different from a slot of a resource corresponding to the conflict information.

* * * * *